(12) United States Patent
Taga et al.

(10) Patent No.: US 6,178,943 B1
(45) Date of Patent: Jan. 30, 2001

(54) CONTROL SYSTEM FOR AN ENGINE

(75) Inventors: Junichi Taga; Michihiro Imada; Masayuki Kuroki; Masayuki Tetsuno; Kiyotaka Mamiya; Hirofumi Nishimura, all of Hiroshima (JP)

(73) Assignee: Mazda Motor Corporation, Hiroshima (JP)

( * ) Notice: Under 35 U.S.C. 154(b), the term of this patent shall be extended for 0 days.

(21) Appl. No.: 09/252,809

(22) Filed: Feb. 19, 1999

(30) Foreign Application Priority Data

Feb. 20, 1998 (JP) .................................................. 10-038780
Feb. 1, 1999 (JP) .................................................. 11-024339

(51) Int. Cl.[7] .................................................. F02D 41/04
(52) U.S. Cl. ........................... 123/295; 123/305; 123/480
(58) Field of Search .................................... 123/295, 305, 123/435, 479, 480, 406.47

(56) References Cited

U.S. PATENT DOCUMENTS

| | | | |
|---|---|---|---|
| 5,718,203 | * 2/1998 | Shimada et al. | 123/435 |
| 5,722,362 | * 3/1998 | Takano et al. | 123/295 |
| 5,875,756 | * 3/1999 | Kamura et al. | 123/295 |
| 5,904,128 | * 5/1999 | Shimada et al. | 123/295 |
| 5,975,044 | * 11/1999 | Kamura et al. | 123/295 |

FOREIGN PATENT DOCUMENTS 7-301139   11/1995   (JP) .

* cited by examiner

Primary Examiner—Henry C. Yuen
Assistant Examiner—Hieu T. Vo
(74) Attorney, Agent, or Firm—Nixon Peabody LLP; Donald R. Studebaker

(57) ABSTRACT

An engine control system for a direct injection-spark ignition type of engine determines a target load based on an engine speed and an accelerator pedal travel, determines target air-to-fuel ratio based on an amount of intake air and the target engine load, and determines an amount of fuel injection based on the target air-to-fuel ratio, so as thereby to control engine output torque balancing the target engine load even during a transitional operating state.

12 Claims, 16 Drawing Sheets

CONTROL SYSTEM FOR AN ENGINE

BACKGROUND OF THE INVENTION

1. Field of the Invention

The invention relates to an engine control system for an engine for controlling the amount of fuel injection according to a target air-fuel ratio determined on the basis of a target engine load.

2. Description of the Related Art

Typically, in an engine performing stratified charge combustion to operate with a lean fuel mixture for which an air-to-fuel ratio is controlled according to according to engine operating conditions, control of the amount of fuel injection is made based on target air-to-fuel ratio determined based on a target engine load or a target value of a factor corresponding to an engine load according to engine operating conditions. A control system for a direct injection-spark ignition type of engine described in, for example, Japanese Unexamined Patent Publication No. 7-301139 determines target engine output torque meeting a target engine load on the basis of an engine speed and an throttle opening and further determines a target air-fuel ratio according to the target output torque by an operation with a map. The amount of fuel injection meeting the engine demand is calculated by using the target air-fuel ratio and the amount of intake air. The amount of intake air is controlled by means of a motor driven throttle valve whose opening is controlled according to accelerator pedal travel.

If simply controlling the amount of fuel injection on the basis of a target air-fuel ratio according to a target engine load or output torque only likely by the engine control system described in the above mentioned publication, the engine does not always produce output torque balancing a target load due to fluctuations of air charging efficiency. This is because air charging efficiency is closely related to engine output torque. For example, because the direct injection-spark ignition type of engine is designed and adapted to make stratified charge combustion by performing fuel injection in compression strokes while the engine operates with lower engine loads and, during the stratified charge combustion, the target air-fuel ratio is varied so as to provide a lean air-fuel mixture, the engine output torque drops if simply controlling the amount of intake air linearly corresponding to a change in accelerator pedal travel. In order to avoid such a drip in engine output torque, it has necessary to increase the amount of intake air while the air-fuel mixture remains lean. For this reason, it has been proposed to control the amount of intake air on the basis of a target engine load, i.e. to control throttle opening according to a target engine load, as well as the target air-to-fuel ratio. However, because, during a transitional engine operating state in which the target engine load varies due to treading on an accelerator pedal, a change in the amount of intake air occurs after a delay from the change in target engine load, it is not impossible to gain output torque balancing the target engine load even when controlling the amount of fuel injection so as to balance the target air-fuel ratio determined on the basis of the target engine load while the air charging efficiency differs from a value corresponding to the target engine load due to the delay.

SUMMARY OF THE INVENTION

It is an objective of the invention to provide an engine control system which adjust a target air-to-fuel ratio to control the amount of fuel injection so as thereby to produce engine output torque balancing a target engine load during a transitional engine operating state.

The foregoing object of the present invention is achieved by providing an engine control system for an engine equipped with a fuel injector for determining a target air-to-fuel ratio based on target loads established according to engine operating conditions and controlling the amount of fuel injection according to the target air-to-fuel ratio. The engine control system is characterized by determining a target load based on an engine speed and an accelerator pedal travel, determining a target air-to-fuel ratio based on an amount of intake air and the target load based on which the amount of fuel injection is determined.

With the engine control system which determines a target air-to-fuel ratio based on an amount of intake air and a target engine load, even when an actual air charging efficiency differs from a value corresponding to a target engine load in an ordinary operating state due to a delay of a change in the amount of intake air in responding relative to a change in the target engine load occurring in, for example, a transitional operating state, the target air-to-fuel ratio and the amount of fuel injection based on the target air-to-fuel ratio are adjusted according to the actual air charging efficiency so as thereby to provide engine output torque balancing the target engine load.

The engine control system may control operation of the engine in a plurality of operation modes in which fuel injection timing are different and which are selected according to the target air-to-fuel ratio. The fuel injection timing is determined by each operation mode according to a target engine load and an engine speed. In this instance, the fuel injection timing is adjusted to accord with the target air-to-fuel ratio determined based on an actual air charging efficiency. In the case where the engine is of a direct injection-spark ignition type and changeable in operation between a stratified charge combustion mode in which the fuel injector deliver fuel in a compression stroke to cause a stratified charge combustion and a homogeneous charge combustion mode in which the fuel injector deliver fuel in an intake stroke to cause a homogeneous charge combustion, the fuel injection timing is properly adjusted to accord with the target air-to-fuel ratio even during a transition between the stratified charge combustion mode and the homogeneous charge combustion mode. Though the direct injection-spark ignition type of engine is apt to cause a significant change in air-to-fuel ratio, and hence a change in the amount of intake air due to the change in air-to-fuel ratio, following a transition of operation mode, the engine output torque is adjusted to properly balance the target engine load.

The engine control system may employ as the target engine load either one control parameter of a virtual air charging efficiency balancing an output torque required on the assumption that the engine operates with a stoichiometric air-to-fuel ratio and a value corresponding to the virtual charging efficiency and determines the target air-to-fuel ratio based on a ratio of the one control parameter to either one control parameter of an actual air charging efficiency determined based on the amount of intake air and a value corresponding to the actual air charging efficiency. This provides easy determination of the target air-to-ratio according to the actual air charging efficiency.

The engine control system may temper the target air-to-fuel ratio with an improvement ratio of fuel consumption when the target air-to-fuel ratio is changed toward the lean side from a fuel consumption at a stoichiometric air-to-fuel ratio, which prevents the engine to cause fluctuations of output torque due to improvement of fuel consumption during lean charge combustion as compared with stoichiometric charge combustion.

The engine control system may further determine a target air-to-fuel ratio according to a predetermined relationship between the target load and the engine speed, and determine an eventual target air-to-fuel ratio based on the target air-to-fuel ratio determined based on the amount of intake air and the target engine load during a transitional operating state and based on the target air-to-fuel ratio determined according to the predetermined relationship between the target load and the engine speed during an ordinary operating state. In this embodiment, it is possible to avoid establishing a target air-to-fuel ratio at which an increase in NOx emission is caused and, however, select it while an ordinary operating state lasts. Further, the engine control system may further perform a correction of an ignition timing according to a difference of the target air-to-fuel ratio for a transitional operating state from the target air-fuel ratio for an ordinary operating state. With this embodiment, even during a transitional operating state in which the target air-to-fuel ratio is apt to differ from one in the ordinary operating state, the ignition timing is corrected according to the difference of air-to-fuel ratio, causing ignition with a proper timing.

The engine control system determines, based on a target load, a control parameter for the intake air control means which controls an amount of intake air with which intake air is introduced into an intake line of the engine. In this instance, the engine control system takes as the target load for determining a target air-to-fuel ratio for controlling the amount of fuel injection either a virtual air charging efficiency balancing an output torque required for the engine as assumed that the engine operates with a stoichiometric air-to-fuel ratio or a value corresponding to the virtual charging efficiency after tempering treatment and takes as the target load for determining a target air-to-fuel ratio for controlling the amount of intake air either a virtual air charging efficiency before tempering treatment or a value corresponding to the virtual air charging efficiency. According to the engine control system, the control of the amount of intake air which is one of a slow response group of control parameters and the control of the amount of fuel injection which is one of a fast response group of control parameters are governed to occur at properly adjusted timings.

The engine control system may further perform a first-order advance correction of the target load, which is desirable to perform the control of the amount of intake air with a reduced delay in response and with a timing properly adjusted relatively to the control of the amount of fuel injection.

According to another embodiment of the invention, the engine control system for a direct injection-spark ignition type of engine changes operation of the engine between a stratified charge combustion mode in which the fuel injector deliver fuel in a compression stroke to cause a stratified charge combustion while an air-to-fuel ratio remains greater than a stoichiometric air-to-fuel ratio and a homogeneous charge combustion mode in which the fuel injector deliver fuel in an intake stroke to cause a homogeneous charge combustion with an air-to-fuel ratio remaining greater than the stoichiometric air-to-fuel ratio, controls the amount of fuel injection so as to change an air-to-fuel ratio greater by a specified value than the stoichiometric air-to-fuel ratio to an air-to-fuel ratio smaller than the stoichiometric air-to-fuel ratio at one stretch during a transition to the stratified charge combustion mode from the homogeneous charge combustion mode, and retards an ignition timing until an air charging efficiency reaches a value attained in an ordinary operation state from a time at which the air-to-fuel ratio becomes below the stoichiometric air-to-fuel ratio when the transition occurs. The retardation of ignition timing may be determined according to a difference between target air-to-fuel ratios for a transitional operation state and an ordinary operation state. With the engine control system, in the course where, during the transition to the stratified charge combustion mode from the homogeneous charge combustion mode, the air-to-fuel ratio gradually changes toward the rich side from an air-to-fuel ration on the lean side in the stratified charge combustion mode, the air-to-fuel ratio is forced to change to the stoichiometric air-to-fuel ratio at one stretch as soon as it reaches an air-to-fuel ratio higher by a specified value than the stoichiometric air-to-fuel ratio. Accordingly, the air-to-fuel ratio is prevented from changing via one at which NOx is apt to be produced. While this control lowering the air-to-fuel ratio below the stoichiometric air-to-fuel ratio is executed by increasing the amount of fuel ratio and in consequence tends to cause a sharp increase in output torque, the tendency is cancelled by retarding the ignition timing. The output torque is properly controlled by adjusting the retardation of ignition timing according to a difference between target air-to-fuel ratios for a transitional operation state and an ordinary operation state.

BRIEF DESCRIPTION OF THE DRAWINGS

The foregoing and other objects and features of the present invention will be clearly understood from the following detailed description of preferred embodiments when read in conjunction with the accompanying drawings, in which.

DETAILED DESCRIPTION OF THE PREFERRED EMBODIMENT

Figure 1:
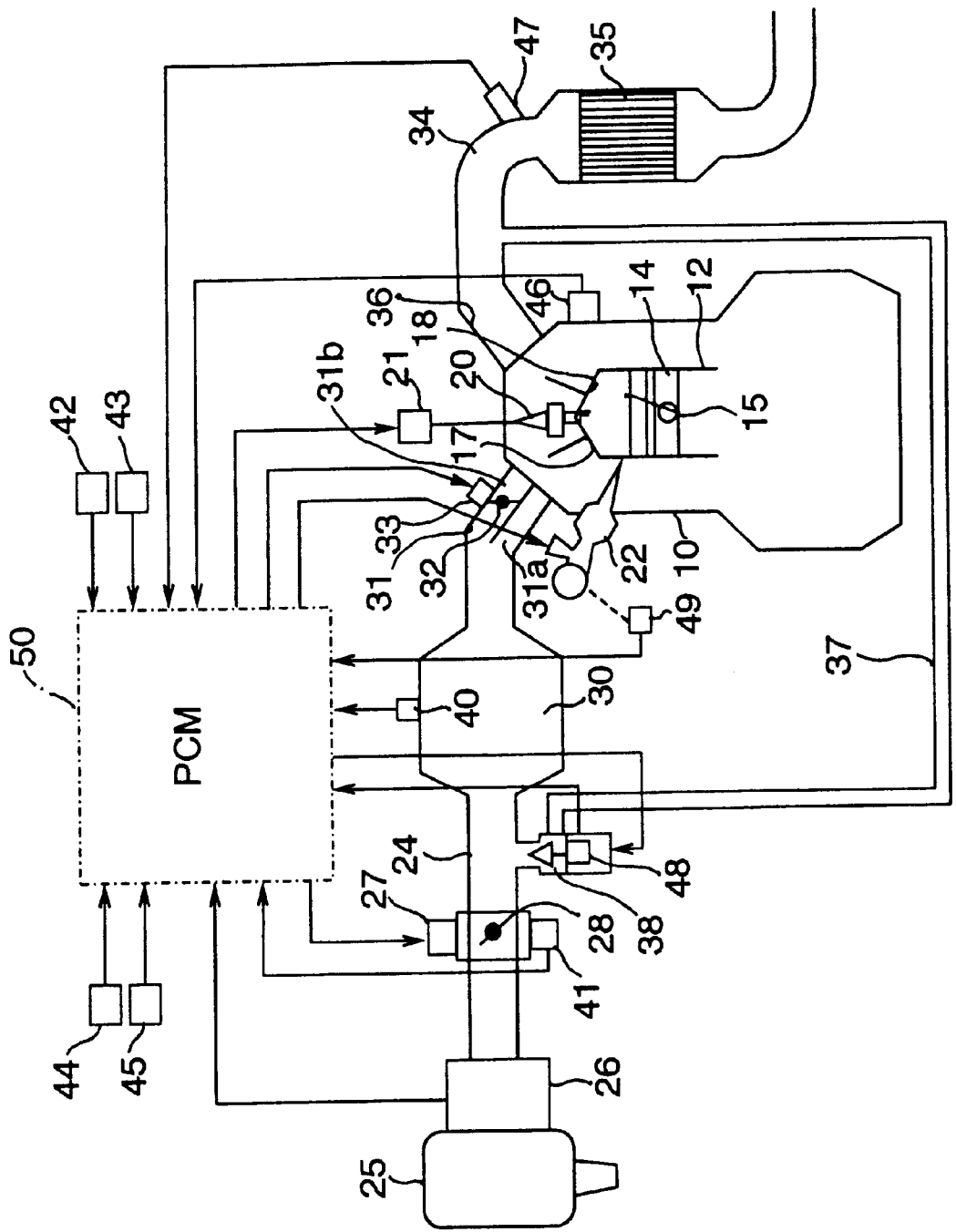
FIG. 1 is a schematic illustration of an engine control system in accordance with an embodiment of the invention.

Referring to the drawings in detail and, in particular, to FIG. 1 schematically illustrating an engine control system in accordance with an embodiment of the invention which is adapted to be suitable for, for example, a direct injection-spark ignition type of engine, a direct injection-spark ignition type of engine (which is hereafter referred to as an engine for simplicity) 10 has a plurality of cylinders (only one of which is shown) 12 in which pistons 14 slide. Each cylinder 12 has a combustion chamber 15 formed above the top of the piston 14 and is provided with two intake ports (not shown) and two exhaust ports (not shown) opening into the combustion chamber 15. The intake port and the exhaust port are opened and shut at a predetermined timing by an intake valve 17 and an exhaust valve 18, respectively. The cylinder 12 at its center is further provided with a spark plug 20 extending down into the combustion chamber 15. A fuel injector 22 is located so as to inject fuel directly into the combustion chamber 15 from the inner side wall of the cylinder 12. The fuel injector 22 is connected to a fuel system (not shown) including at least a high pressure fuel pump and a pressure regulator. The fuel system provides specified fuel pressure higher than an internal pressure of the cylinder 12.

The engine 10 has an intake pipe 24 and an exhaust pipe 34. The intake pipe 24 is provided with an air cleaner 25, an air flow sensor 26, a throttle valve 28 driven by a motor 27 and a surge tank 30 arranged in order from the upstream end. The intake pipe 24 is connected to the engine through a manifold 31 having discrete pipes in communication with the respective intake ports of the respective cylinders 12. The each discrete pipe is divided into two pipe sections, namely a first discrete pipe section 31a and a second discrete pipe section 31b opening into the intake ports, respectively, of each cylinder 12. A swirl control valve 32 is installed in the second discrete part section 31b. The swirl valve 32 is driven by an electrically controlled actuator 33. While the actuator 33 drives the swirl valve 32 to close the second discrete part section 31b, an intake air stream passed through the first discrete pipe section 31a generates a swirl in the combustion chamber 15. As the actuator 33 drives the swirl valve 32 to gradually open the second discrete part section 31b, the swirl is gradually made weak. The exhaust pipe 34 is connected to the engine through an exhaust manifold 36 having discrete pipes in communication with the respective exhaust ports of the respective cylinders 12. An exhaust gas purifying catalyst 35 is installed in the exhaust pipe 34. The exhaust gas purifying catalyst 35 is of the type which lowers an emission level of nitrogen oxides (NOx) even under learn burn conditions. For example, the exhaust gas purifying catalyst 35 may be of the NOx absorbing type which absorbs NOx in the exhaust gas while a lean fuel mixture is burnt and catalyzes reduction of NOx while the engine operates with a stoichiometric air-fuel mixture or an air-fuel mixture of an air-to-fuel ratio greater than the stoichiometric air-to-fuel ratio. The engine 10 is further provided with an exhaust gas recirculation system 37 between the intake pipe 24 and the exhaust pipe 30 to admit hot exhaust gas into an air stream before the surge tank 30. The exhaust gas recirculation system 37 incorporates an exhaust gas recirculation (EGR) valve 38 equipped with a valve lift sensor 48.

The engine 10 is equipped with various sensors besides the air flow sensor 26 and the valve lift sensor 48. The sensors includes at least a boost sensor 40 operative to monitor negative pressure in the surge tank 30, a throttle opening sensor 41 operative to monitor an opening of the throttle valve 28 a speed sensor 42 operative to monitor a speed of rotation of the engine 10, a position sensor 43 operative to monitor an accelerator pedal (not shown) travel, a temperature sensor 44 operative to monitor a temperature of intake air, a pressure sensor 45 operative to monitor an atmospheric pressure, a temperature sensor 46 operative to monitor a temperature of engine cooling water, an oxygen (O2) sensor 47 operative to monitor an oxygen concentration of exhaust gas as an air-to-fuel ratio and a pressure sensor 49 operative to monitor the pressure of fuel delivered to the fuel injector 22. The respective sensors 26 and 40–49 provide output signals representative of monitored values and send them to an engine control unit (PCM) 50.

The engine control unit (PCM) 50 controls the fuel injector to deliver a given amount of fuel injection at a desired timing and provides a motor control signal for the motor 27 to actuate the throttle valve 28, an ignition signal for a ignition circuit 21 to control an ignition timing, an actuation signal to control the swirl control valve 32 and a control signal for the exhaust gas recirculation (EGR) valve 38 to control the amount of exhaust gas that is recirculated.

Figure 10:
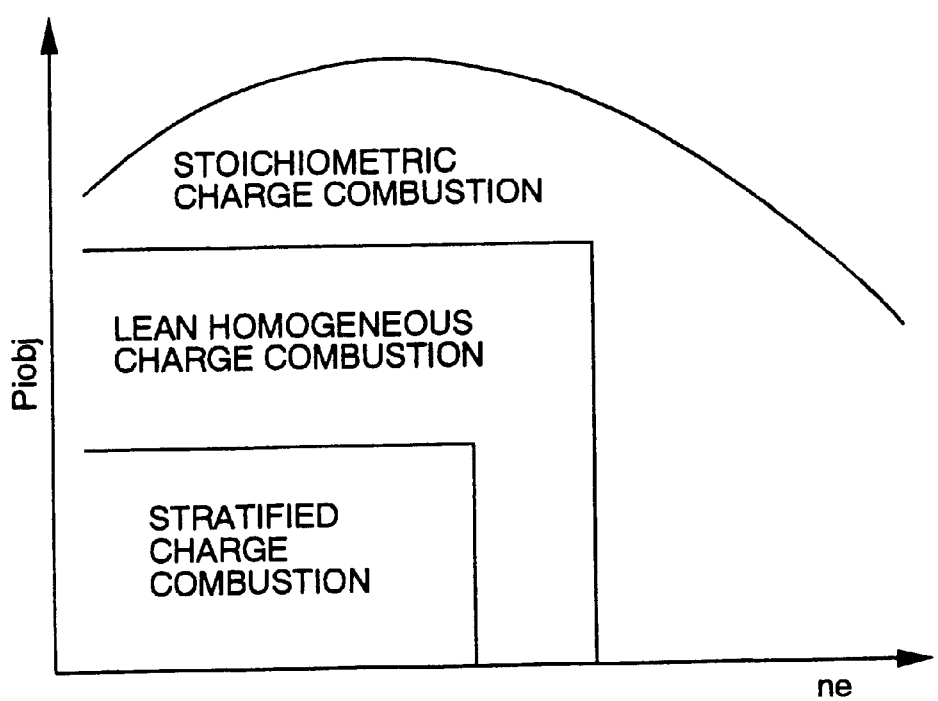
FIG. 10 is a diagram showing engine operating zones for various engine operation modes.

In the engine control for the direct injection-spark ignition engine, predetermined engine operation modes in which the engine is operated with different ignition timings and air-to-fuel ratios are selected as a basic engine operation mode and the basic engine operation mode is changed from one to another according to engine operating conditions. Specifically, as will be described in detail later, engine operating conditions are divided into a plurality of zones, namely for example a stratified charge combustion zone for specified lower engine loads and speeds and a homogeneous charge combustion for engine loads and speeds other than the specified lower engine loads and speeds such as shown in FIG. 10. In the stratified charge combustion zone, the engine is operated in a stratified charge combustion mode in which an air fuel mixture is unevenly strongly distributed or stratified around the spark plug 20 by injecting fuel in a later half of compression stroke. During operation of the engine in the stratified charge combustion mode, the throttle valve 28 is controlled to provide a great opening to increase the amount of intake air, so as thereby to distribute an air-fuel mixture with a significantly high air-to-fuel ratio, for example with an air-to-fuel ratio greater than 30, in the entire combustion chamber 15. On the other hand, in a homogeneous charge combustion zone, the engine is operated in the homogeneous charge combustion mode in which an air fuel mixture is evenly distributed in the entire combustion chamber 15 by injecting fuel in a early half of intake stroke. During operation of the engine in the homogeneous charge combustion mode, the air excess ratio λ is made greater than 1 (one), in other words, the air-to-fuel ratio is made greater than a stoichiometric air-to-fuel ratio up to, for example, 20 to 25 in a relatively lower engine load and speed zone adjacent to the stratified charge combustion zone. This mode is hereafter referred to as a lean homogeneous charge combustion mode. However, the air excess ratio λ is made equal to 1 (one), or the air-to-fuel ratio is made equal to a stoichiometric air-to-fuel ratio of 14.7 in a higher engine load and speed zone. The air excess ratio λ representing the air-to-fuel ratio may be lower than 1 (one) to provide an enriched air-fuel mixture in a full throttle zone in which the throttle valve fully opens or in a high engine load and speed zone close to the full throttle zone. This mode is hereafter referred to as a stoichiometric homogeneous charge combustion mode.

Figure 2:
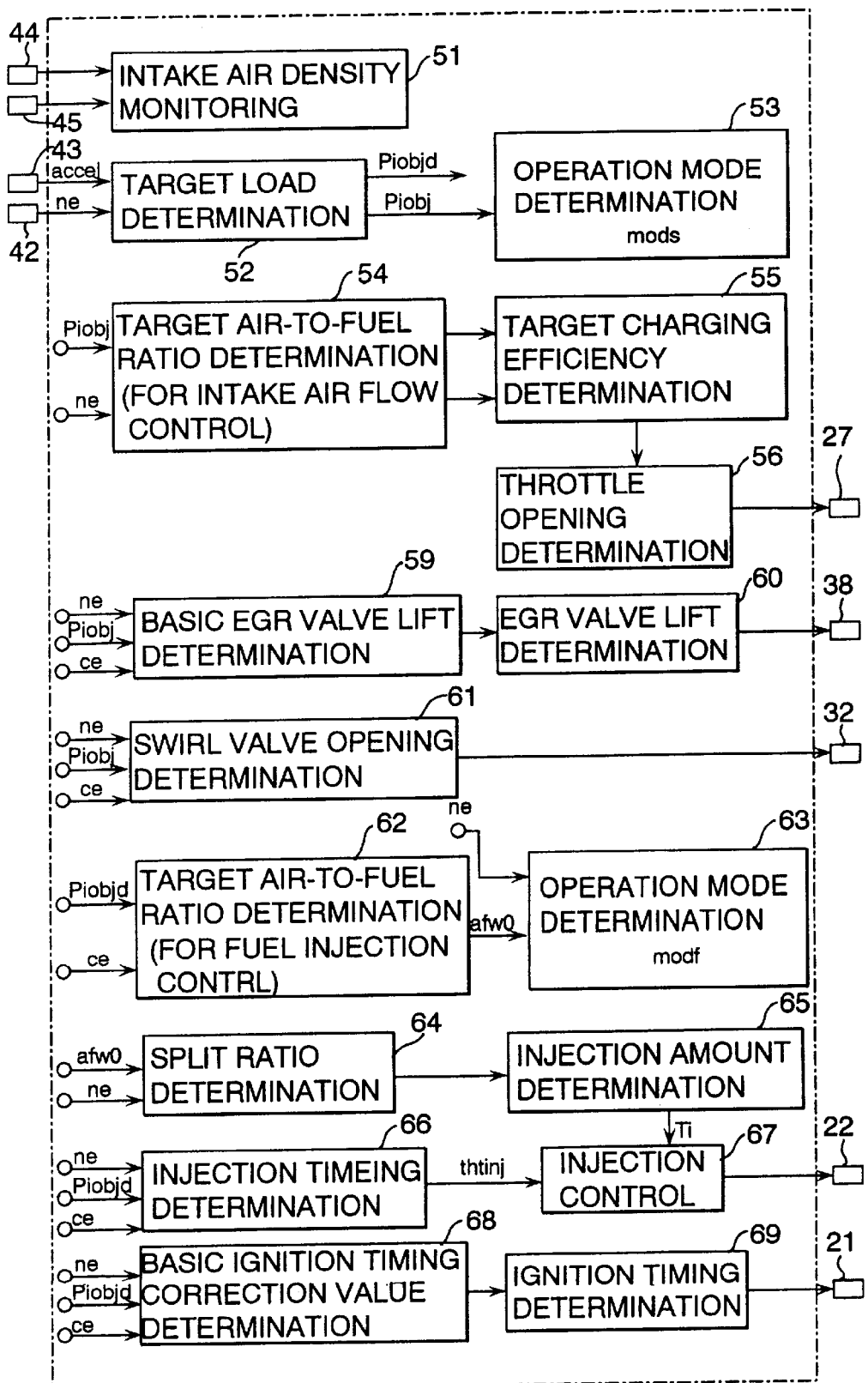
FIG. 2 is a block diagram illustrating functional structure of an engine control unit of the engine control system.
Figure 3:
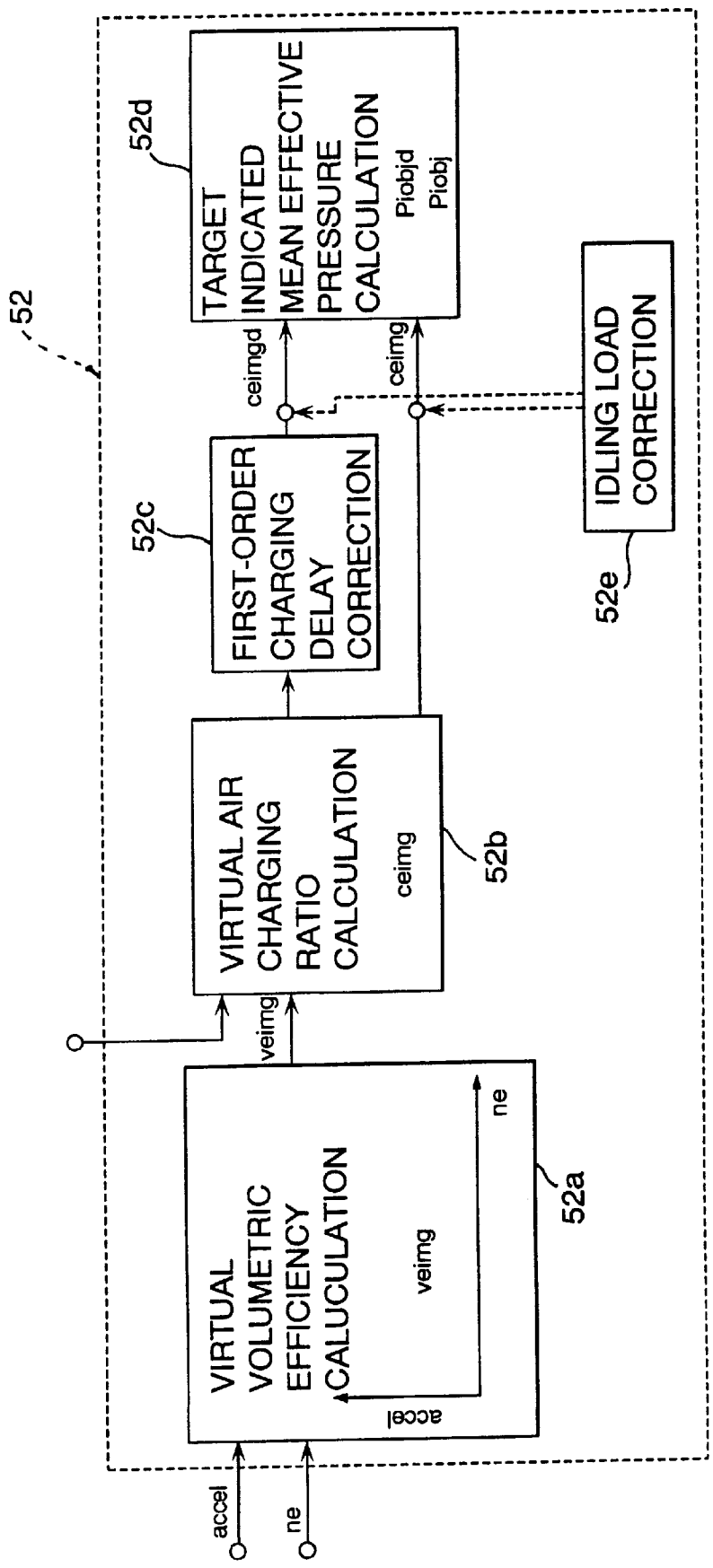
FIG. 3 is a block diagram illustrating the details of target engine load determining function.
Figure 9:
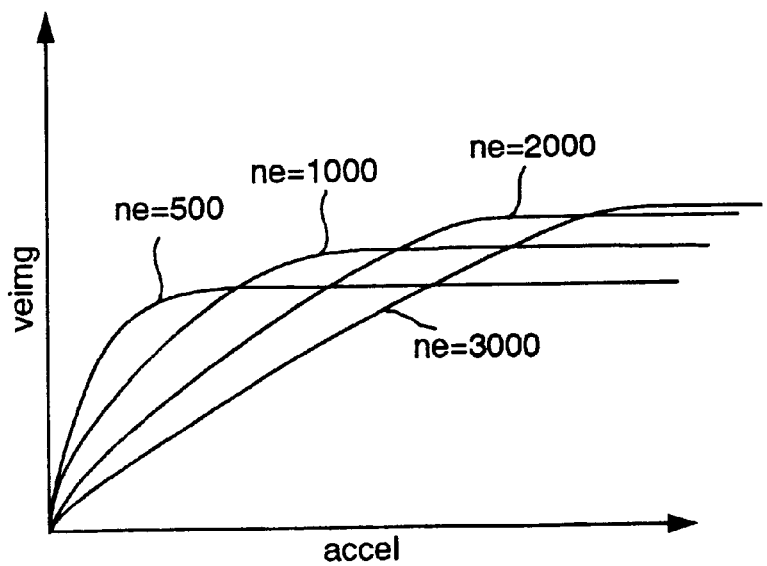
FIG. 9 is a graph showing virtual volumetric efficiency relative to acceleration pedal position for various engine speeds.

FIG. 2 is a block diagram showing a functional structure of the engine control unit (PCM) 50 which comprises a microcomputer. As shown in FIG. 2, the engine control unit (PCM) 50 has various functional means including an intake air density monitoring means 51 operative to monitor intake air density on the basis of signals from the intake air temperature sensor 44 and the atmospheric pressure sensor 45 and a target engine load determining means 52 operative to determine a value relating to a target engine load on the basis of signals from the engine speed sensor 42 and the accelerator pedal travel sensor 43 tinged with the intake air density. As shown in detail in FIG. 3, the target engine load determining means 52 includes a functional means 52a operative to determine a virtual volumetric efficiency veimg, a functional means 52b operative to determine a virtual air charging efficiency ceimg based on the virtual volumetric efficiency veimg, a functional means 52c operative to temper the virtual air charging efficiency ceimg to determine a first-order delay corrected virtual air charging efficiency ceimgd, a functional means 52d operative to calculate a target indicated mean effective pressure Piobjd and a functional means 52e operative to correct the virtual air charging efficiency ceimg according to an idling engine load. The functional means 52a finds a virtual volumetric efficiency calculation veimg with reference to a map of virtual volumetric efficiency defined with respect to acceleration pedal travel accel and engine speed ne such as shown in FIG. 9 which is obtained from the result of bench tests and stored in a memory of the engine control unit (PCM) 50. In this instance, the virtual volumetric efficiency map is provided on the basis of the correspondence relation of virtual volumetric efficiency veimg to acceleration pedal travel accel and engine speed ne when the engine provides required output torque under a standard atmospheric pressure and a standard operating condition in which the air-to-fuel ratio remains stoichiometric. As apparent from FIG. 9 showing a virtual volumetric efficiency map, the virtual volumetric efficiency veimg increases as with a rise in accelerator pedal travel accel and, however, with a decrease in engine speed ne. The virtual air charging efficiency determining means 52b determines a virtual air charging efficiency ceimg as an air charging efficiency meeting the required output torque under the standard operating condition by tempering the virtual volumetric efficiency veimg with the intake air density determined in the intake air density monitoring means 51. The virtual air charging efficiency ceimg is tempered as a tempered virtual air charging efficiency ceimgd in the tempering means 52c. The target indicated mean effective pressure calculating means 52d calculates a first target indicated mean effective pressure Piobj according to the virtual air charging efficiency ceimg and a second target indicated mean effective pressure Piobjd according to the tempered virtual air charging efficiency ceimgd from expressions (7) and (5), respectively, which are described later. The virtual air charging efficiency correcting means 52e determines a correction factor necessary to provide a rise in output torque according to an increase in engine load due to operation of external equipments such as an air conditioning system driven by the engine and corrects these virtual air charging efficiency ceimg and tempered virtual air charging efficiency ceimgd with the corrected according to the correction factor as target engine loads. The engine control unit (PCM) 50 further includes a functional means 53 operative to determine a basic engine operation mode on the basis of both first target indicated mean effective pressure Piobj and engine speed ne. Specifically, as shown in FIG. 10, the stratified charge combustion mode is selected as the basic engine operation mode while the first target indicated mean effective pressure Piobj and the engine speed ne are lower than specified lower threshold values $P_L$ and $N_L$ respectively. The lean homogeneous charge combustion mode is selected as the basic engine operation mode while the first target indicated mean effective pressure Piobj and the engine speed ne are higher than the specified lower threshold values $P_L$ and $N_L$ but lower than specified higher threshold values PH and NH respectively. Further, the stoichiometric homogeneous charge combustion mode is selected while the first target indicated mean effective pressure Piobj and the engine speed ne are higher than the specified higher threshold values $P_H$ and $N_H$ respectively.

The engine control unit (PCM) 50 further includes functional means for determining various control parameters necessary to control output torque, such as the amount of intake air, the amount of exhaust gas that is permitted to recirculate, the strength of swirl, the amount of fuel injection, an injection timing and an ignition time, according to at least target engine load and engine speed. These engine output torque control parameters are divided into two groups, namely a slow response group and a fast response group. The slow response group of control parameters includes the amount of intake air, the amount of exhaust gas recirculation and the strength of swirl which change responding to operation of the throttle valve 28, the exhaust gas recirculation (EGR) control valve 38 and the swirl control valve 32, respectively, with a time delay for which the first target indicated mean effective pressure Piobj is employed to determine them for the control of output torque. The fast response group includes the amount of fuel injection, an injection timing and an ignition timing which response quickly to appearance of control signals, respectively, for which the second target indicated mean effective pressure Piobjd is employed to determine them for the control of output torque. Specifically, the engine control unit (PCM) 50 includes a function of determining the amount of intake air, a function of determining the amount of exhaust gas recirculation and a function of controlling fuel injection. The amount of intake air is determined in a functional means 54 operative to determine a target air-to-fuel ratio afwb, a functional means 55 operative to determine a target air charging efficiency and a throttle opening determining means 56. The target air-to-fuel ratio determining means 54 determines target air-to-fuel ratios afwd for the respective engine operation modes, i.e. the stratified charge combustion mode, the lean homogeneous charge combustion mode and the stoichiometric homogeneous charge combustion mode, for controlling the amount of intake air.

Figure 11A:
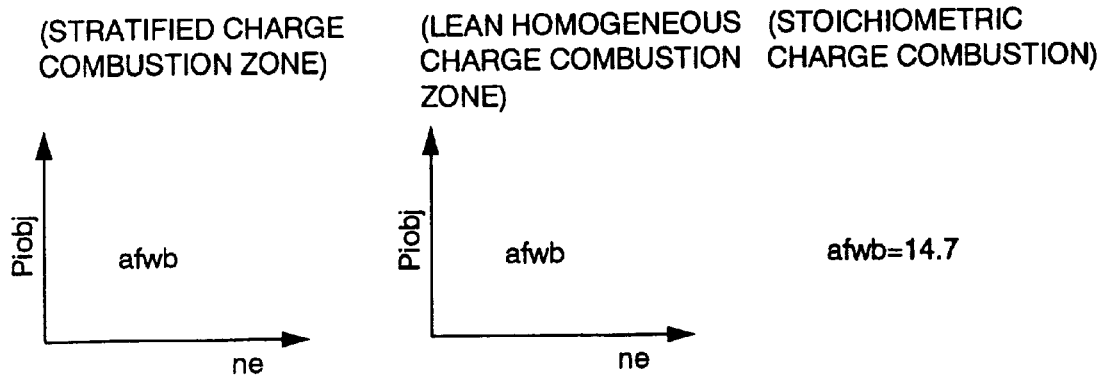
FIGS. 11A, 11B and 11C are schematic illustrations showing target air-fuel ratio control maps, basic EGR valve lift control maps and swirl control opening control maps, respectively, provided for various engine operation modes.

As shown in FIG. 11A, the target air-to-fuel ratio afwd is determined according to first target indicated mean effective pressure Piobj and engine speed ne with reference to a target air-to-fuel ratio control map provided for the stratified charge combustion mode when the engine operates in the stratified charge combustion mode or to a target air-to-fuel ratio control map provided for the lean homogeneous charge combustion mode when the engine operates in the lean homogeneous charge combustion mode, or is fixed at a stoichiometric ratio of 14.7 or it may be represented by an air excess ratio λ of 1 (λ=1) when the engine operates in the stoichiometric charge combustion mode. The target air charging efficiency determining means 55 calculates a target air charging efficiency ceobj according to the virtual air charging efficiency ceimg and the target air-to-fuel ratio afwd from expression (8) which will be described later.

Figure 4:
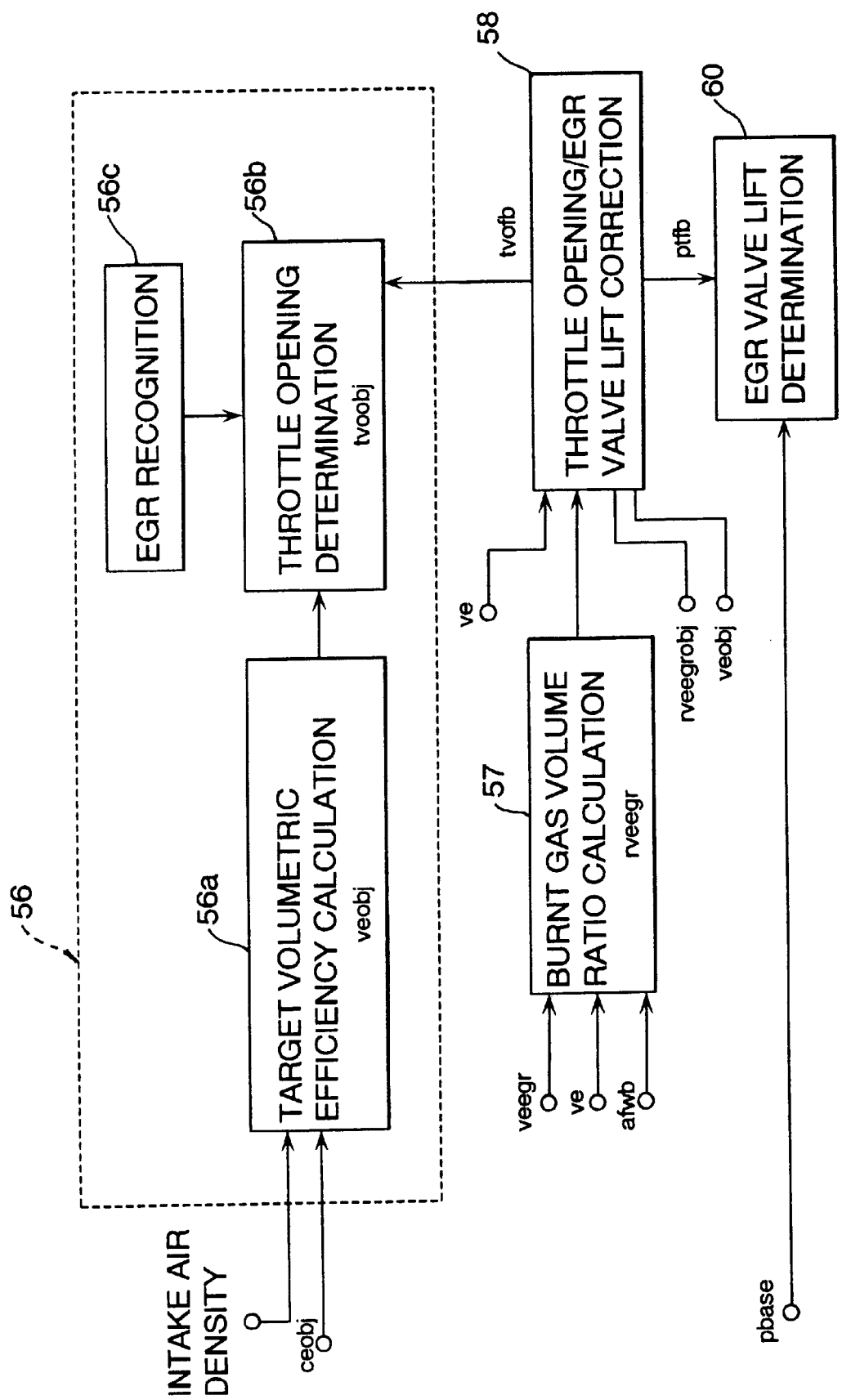
FIG. 4 is a block diagram illustrating the details of throttle opening determining function.
Figure 12:
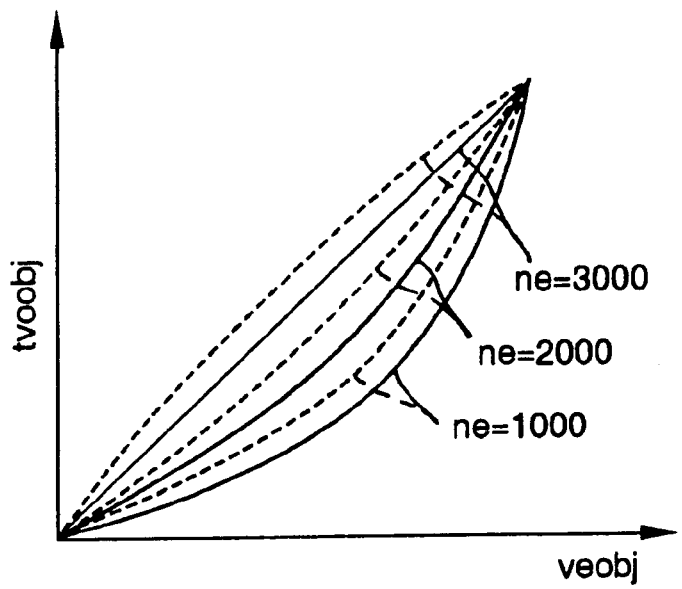
FIG. 12 is a graph showing target volumetric efficiency relative to throttle opening for various engine speeds.

As shown in detail in FIG. 4, the throttle opening determining means 56 includes a functional means 56a operative to calculate a target volumetric efficiency veobj by tempering the target air charging efficiency ceobj with the intake air density. An throttle valve opening tvoobj is determined based on the target volumetric efficiency veobj and the engine speed ne with reference to a throttle valve opening control map. In this instance, because the relationship between volumetric efficiency, throttle valve opening and engine speed is different according to whether or not the exhaust gas recirculation is made, there are provided maps specifying the relationship of throttle valve opening to volumetric efficiency, and engine speed for the cases, respectively. An exhaust gas recirculation judging means 56c judges as to whether the exhaust gas recirculation is executed or not and selects one of the throttle valve opening control maps according to the result of judgement. As shown in FIG. 12, the throttle valve opening control map selected while interrupting the exhaust gas recirculation defines control curves for various engine speeds shown by solid line, and the throttle valve opening control map selected while executing the exhaust gas recirculation defines control curves for various engine speeds shown by broken line. Both maps specify the throttle valve opening tvoobj such that it changes greater with an increase in target volumetric efficiency veobj and with a rise in engine speed ne and that it is greater while executing the exhaust gas recirculation than while interrupting the exhaust gas recirculation. As is known, exhaust gases produced from combustion of a lean air-fuel mixture during engine operation in, for example, the stratified charge combustion mode and recirculated contain not only combustion gases but also a large amount of air or oxygen ($O_2$) and the air content of exhaust gases affects the amount of air or oxygen ($O_2$) introduced into the combustion chamber 15. For this reason, in this instance, the engine control unit (PCM) 50 incorporates a burned gas volume ratio calculating means 57 and a throttle valve opening/EGR valve lift correcting means 58 to determine a correction value tvofb for the opening of throttle valve and a correction value ptfb for the amount of exhaust gas recirculation to be admitted into an air stream. In the throttle valve opening/EGR valve lift correcting means 58, the throttle opening is corrected based on the result of a comparison of the burned gas volume ratio rveegrobj obtained in the burned gas volume ratio calculating means 57 with a target burned gas volume ratio rveegrobj and a comparison of the actual volumetric efficiency ve obtained based on an output from the air flow sensor 26 with the target volumetric efficiency veobj. In relation with the corrected throttle opening, a correction of EGR valve lift is made. The target burned gas volume ratio rveegrobj is determined with reference to a map similar to a map of basic EGR valve lift control map which will be described later.

Figure 11B:

A basic EGR valve lift determining means 59 is incorporated besides the EGR valve lift determining means 60 to determine an eventual EGR valve lift which the amount of exhaust gas recirculation depends upon. The basic EGR valve lift determining means 59 determines a basic EGR valve lift phase for each of the engine operation modes determined in the basic engine operation mode determining means 53. As shown in FIG. 11(B), the basic EGR valve lift pbase is determined according to first target indicated mean effective pressure Piobj and engine speed ne with reference to a basic EGR valve lift control map provided for the stratified charge combustion mode when the engine operates in the stratified charge combustion mode, or is fixed at 0 (zero) when the engine operates in the lean homogeneous charge combustion mode, or is determined according to actual air charging efficiency ce obtained based oil an output from the air flow sensor 26 and engine speed ne with reference to a basic EGR valve lift control map provided for the stoichiometric homogeneous charge combustion mode when the engine operates in the stoichiometric homogeneous charge combustion mode. Further, the EGR valve lift determining means 60 tinges the basic EGR valve lift phase with the correction value pi for the amount of exhaust gas recirculation determined therein to determine an eventual EGR valve lift egrobj.

Figure 11C:
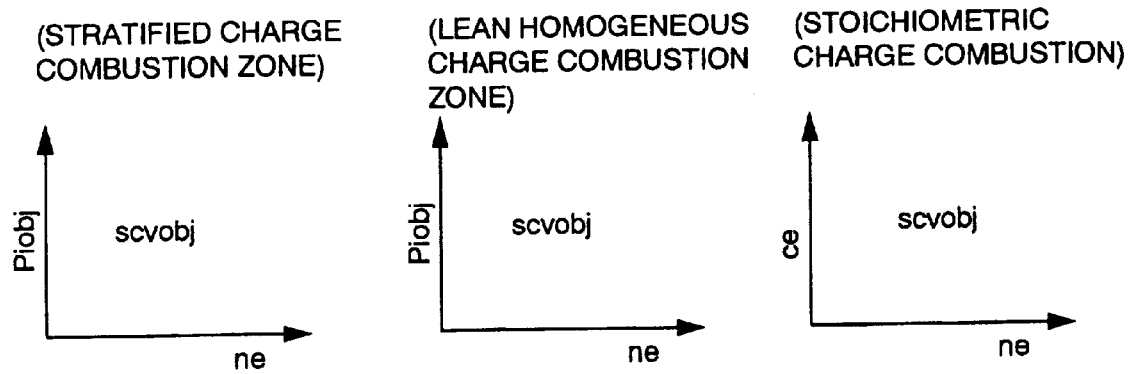

The engine control unit (PCM) 50 further includes a swirl valve opening determining means 61 in which the opening of the swirl valve 32 is determined to provide required strength of a swirl for each of the engine operation modes determined in the basic engine operation mode determining means 53. Specifically, as shown in FIG. 11(C), the eventual swirl valve opening scvobj is determined according to first target indicated mean effective pressure Piobj and engine speed ne with reference to a swirl valve opening control map provided for the stratified charge combustion mode when the engine operates in the stratified charge combustion mode or to a swirl valve opening control map provided for the lean homogeneous charge combustion mode when the engine operates in the lean homogeneous charge combustion mode, or is determined according to actual air charging efficiency ce and engine speed ne with reference to a swirl valve opening control map when the engine operates in the stratified charge combustion mode.

Figure 14A:
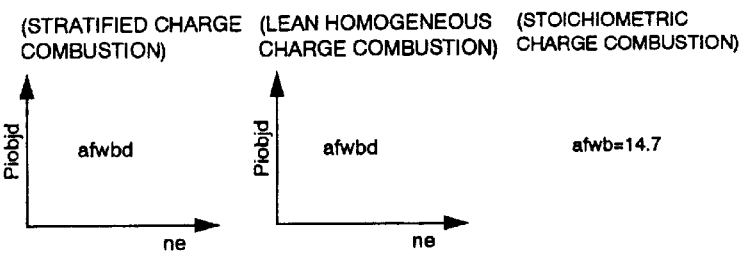
FIGS. 14A, 14B and 14C are schematic illustrations showing target air-fuel ratio control maps, basic EGR valve lift control maps and swirl control opening control maps, respectively, provided for various engine operation modes.

Fuel injection control is performed through a target air-to-fuel ratio determining means 62, an engine operation mode determining means 63, a split ratio determining means 64, an injection amount determining means 65 and an injection timing control means 66 as shown in FIG. 2. The target air-to-fuel ratio determining means 62 determines a target air-to-fuel ratio used for controlling the amount of fuel injection and includes functional means 62a–62d. The functional means 62a operates to determine, on the basis of actual air charging efficiency ce represented by an output from the air flow sensor 26 and second target indicated mean effective pressure Piobjd corresponding to the target engine load or virtual air charging efficiency ceimgd corresponding to the second target indicated mean effective pressure Piobjd, a target air-to-fuel ratio afw0 used mainly in a transitional operating state in which a target engine load changes resulting from treading the accelerator pedal from expression (6) which will be described later. The functional means 62b operates to determine a target air-to-fuel ratio afwbd used mainly in an ordinary operating state of the engine. As shown in FIG. 14A, the target air-to-fuel ratio afwbd is determined according to second target indicated mean effective pressure Piobjd and engine speed ne with reference to a target air-to-fuel ratio control map provided for the stratified charge combustion mode or the lean homogeneous charge combustion mode when the engine operates in the stratified charge combustion mode or the lean homogeneous charge combustion mode, respectively, or is fixed at a stoichiometric air-to-fuel ratio of 14.7 which is equivalently represented by an air excess ratio $\lambda$ of 1 ($\lambda=1$) when the engine operates in the stoichiometric charge combustion mode. If necessary, the target air-to-fuel ratio afwbd may be made lower than the stoichiometric ratio which is equivalently represented by an air excess ratio $\lambda$ equal to or smaller than 1 ($\lambda \leq 1$) for especially higher engine loads and speeds even in the stoichiometric homogeneous charge combustion mode. The functional means 62c calculates a difference dafwb between the target air-to-fuel ratio afwb used for controlling the amount of intake air determined in the target air-to-fuel ratio determining means 54 and the target air-to-fuel ratio afw0 for controlling the amount of fuel injection in the target air-to-fuel ratio determining means 62a in order to detect a transitional operating state. The eventual air-to-fuel ratio determining means 62d employs the target air-to-fuel ratio afw0 determined in the target air-to-fuel ratio determining means 62a as the eventual target air-to-fuel ratio afw during a transitional operating state in which the air-to-fuel ratio difference dafwb is large or the target air-to-fuel ratio afwbd determined in the target air-to-fuel ratio determining means 62b as the eventual target air-to-fuel ratio afw in ordinary operation of the engine in which the air-to-fuel ratio difference dafwb is small. While the target air-to-fuel ratio determining means 62 is complexly structured as above is to satisfy a demand for output torque and a required emission level, the target air-to-fuel ratio determining means 62 may be simplified by omitting the target air-to-fuel ratio determining means 62b and the target air-to-fuel ratio difference calculating means 62c therefrom. In this case, the target air-to-fuel ratio afw0 determined in the target air-to-fuel ratio determining means 62a is always taken as the eventual target air-to-fuel ratio afw for controlling the amount of fuel injection.

Figure 5:
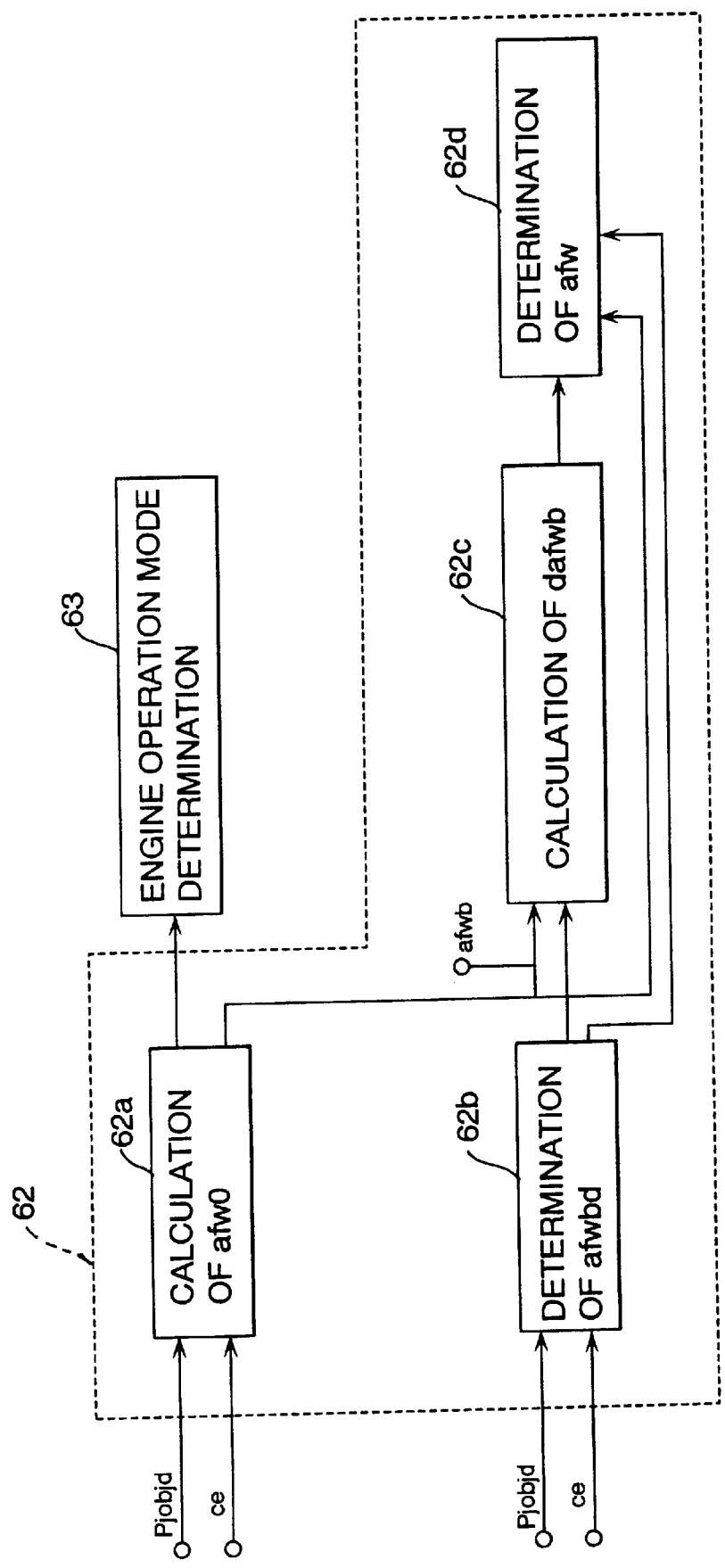
FIG. 5 is a block diagram illustrating the details of target air-fuel ratio determining function.

A functional means 62 shown in FIG. 5 operates to calculate a target air-to-fuel ratio difference dafwbd or dafw0 for correcting an ignition timing during a transitional operating state. Specifically, the target air-to-fuel ratio difference calculating means 80 calculates the target air-to-fuel ratio difference dafwbd by subtracting the eventual target air-to-fuel ratio afw from the target air-to-fuel ratio afwbd in any combustion mode other than the stoichiometric homogeneous charge combustion mode or the target air-to-fuel ratio difference dafw0 by subtracting the eventual target air-to-fuel ratio afw from the target air-to-fuel ratio afw0 in the stoichiometric homogeneous charge combustion mode.

Figure 13:
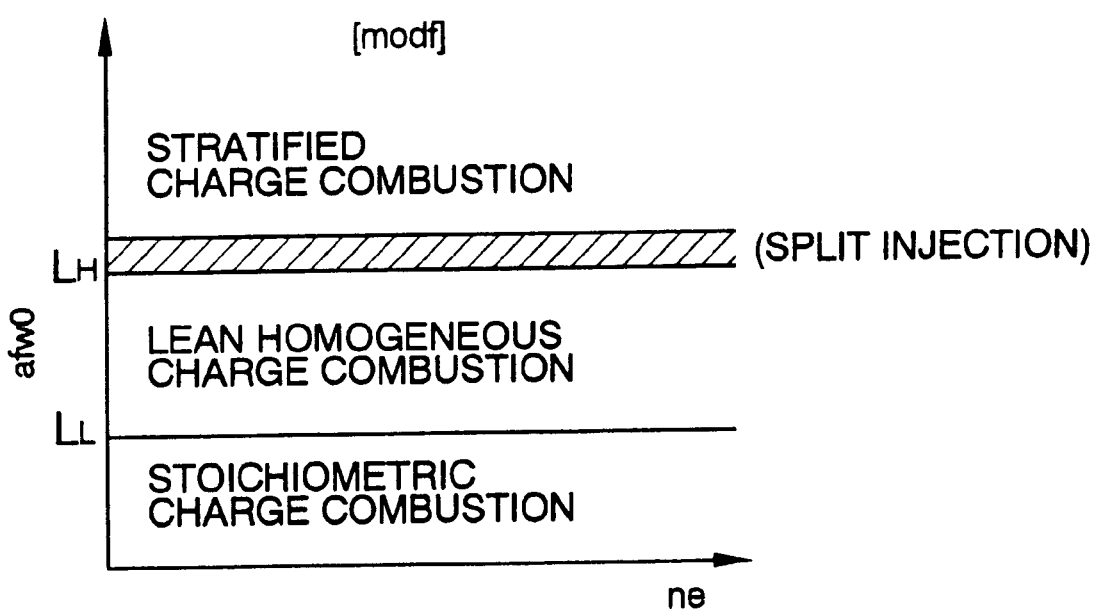
FIG. 13 is a diagram showing engine operating zones for various engine operation modes for fuel injection control.

The engine operation mode determining means 63 determines a combustion mode used to determine a reference combustion mode as used to determine the fast response group of control parameters according to the target air-to-fuel ratio afw0 for controlling the amount of fuel injection. As shown in FIG. 13, the reference combustion mode takes the stoichiometric homogeneous charge combustion mode when the target air-to-fuel ratio afw0 is smaller than a lower limit LL (which is, for example, approximately 18) for the lean homogeneous charge combustion mode when the target air-to-fuel ratio afw0 is greater than the lower limit LL but smaller than an upper limit LL for the lean homogeneous charge combustion mode, or the stratified charge combustion mode when the target air-to-fuel ratio afw0 is greater than the upper limit LH. During a transitional operating state in which the target air-to-fuel ratio afw0 changes across the upper limit LH, a narrow band of split injection mode may be provided between the lean homogeneous charge combustion mode and the stratified charge combustion mode as shaded in FIG. 13. In the split injection mode, fuel injection is split into two parts, namely a part of fuel injection made in an intake stroke (an intake stroke split injection) and a part of fuel injection made in a compression stroke (compression stroke split injection). When performing the split injection during a change from the lean homogeneous stratified charge combustion mode in which intake stroke injection is made to the stratified charge combustion mode in which compression stroke injection is made or vice versa, an abrupt change in combustion condition is prevented.

Figure 6:
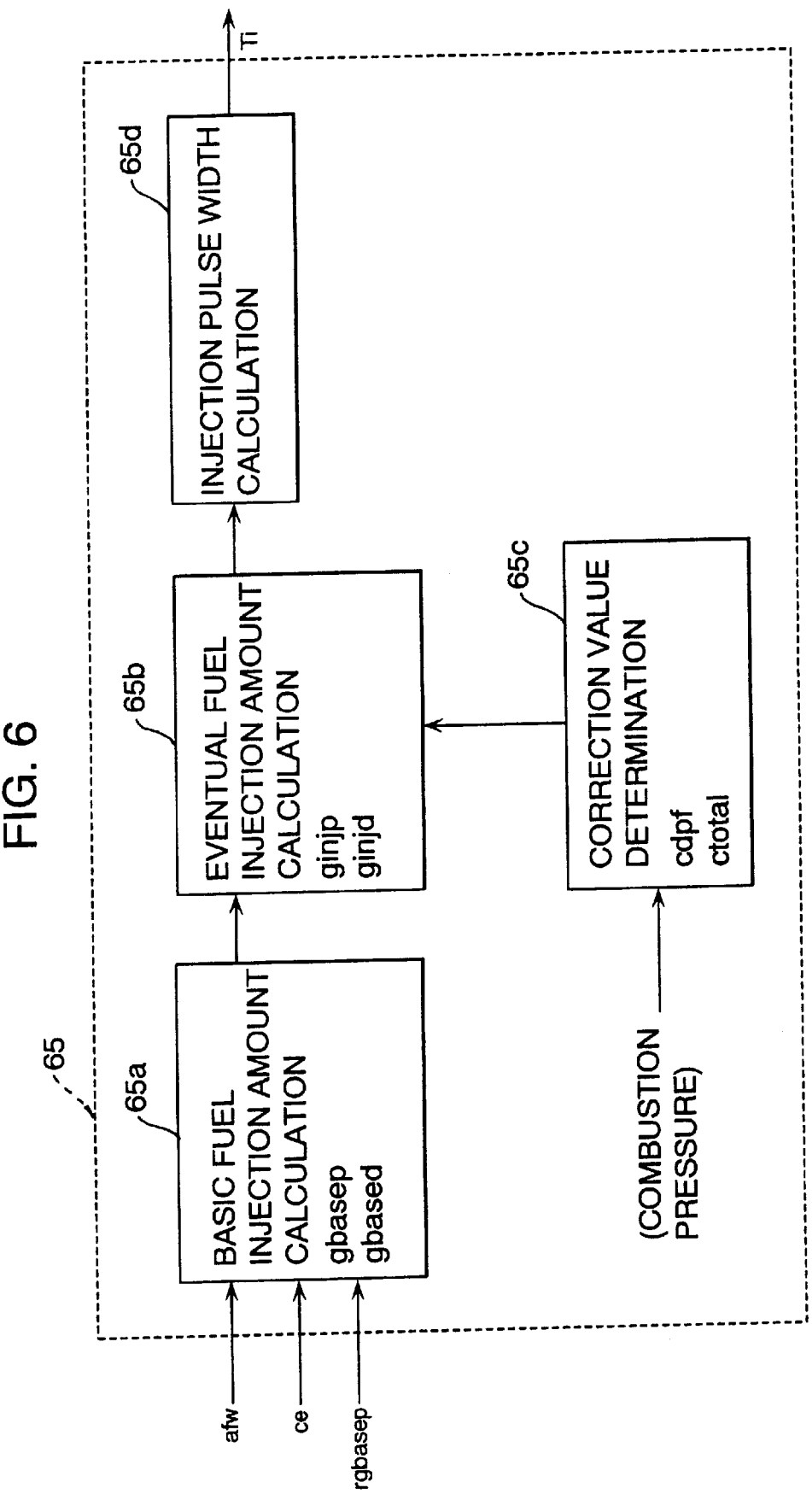
FIG. 6 is a block diagram illustrating the details of fuel injection amount determining function.

A split ratio with which the given amount of fuel injection is split into two parts for intake stroke split injection and compression stroke split injection, respectively, is determined according to combustion modes in a functional means 64. The split ratio for the intake stroke split injection rqbasep is fixedly set to 0 (zero) % in the stratified charge combustion mode and 100% in the lean homogeneous charge combustion mode or the stoichiometric homogeneous charge combustion mode. When entering the split injection mode, the split ratio is determined according to eventual target air-to-fuel ratio afw and engine speed ne. The amount of fuel injection is calculated based on the eventual target air-to-fuel ratio afw determined in the target air-to-fuel ratio determining means 62. As shown in FIG. 6, the injection amount determining means 65 for calculating the amount of fuel injection includes basic fuel injection determining means 65a, correction value determining means 65b, eventual fuel injection determining means 65c and injection pulse width determining means 65d. Specifically, the basic fuel injection determining means 65a calculates basic amounts of fuel injection qbasep, and qbased for intake stroke split injection and compression stroke split injection, respectively, based on the eventual target air-to-fuel ratio afw obtained in the actual air charging efficiency ce, the fuel injection split ratio rqbasep and a conversion factor KGKF. The basic amounts of fuel injection qbasep, and qbased are given by the following expression (1):

$$qbasep = KGKF \times (ce(i)/afw(i)) \times rqbasep(i)$$
$$qbased = KGKF \times ce(i)/afw_{(i-1)} \times qbasep_{(i-1)} \quad (1)$$

where the actual air charging efficiency ce followed by an affix (i) is the latest value thereof (a value immediately before the compression stroke split injection) and the actual air charging efficiency ce, the eventual target air-to-fuel ratio afw and the basic amounts of fuel injection qbasep followed by an affix (i-1) are the last values thereof.

The correction value determining means 65b calculates correction values cdpfp and cdpfd for intake stroke split injection and compression stroke split injection and a correction value ctotal for other control parameters according to fuel pressures. The correction value cdpfp, cdpfd according to fuel pressure is used to correct the amount of fuel injection when the fuel pressure is lower than a predetermined level of pressure immediately after an engine start. The correction value cdpfp, cdpfd is given by, for example, the square root of a ratio of a predetermined of pressure (KGPFUEL) to a fuel pressure (pfuel) detected by a fuel pressure sensor 49. Further, the eventual fuel injection determining means 65c calculates eventual amounts of fuel injection qinjp and qinjd for intake stroke split injection and compression stroke split injection, respectively. The eventual amounts of fuel injection qinjp and qinjd are given by the following expression (2):

$$qinjp = qbasep \times cdpfp \times (1+ctotal_{(i)})$$

$$qinjd = qbased \times cdpfd \times \{1+ctotal_{(i-1)}\} \qquad (2)$$

where the correction value ctotal followed by an affix (i–1) is the last value thereof (the value immediately before the intake stroke split injection).

Finally, an injection pulse width Ti for the eventual amount of fuel injection qinjp, qinjd is determined in the injection pulse width determining means 65*d*.

The reason for the utilization of the last value of eventual target air-to-fuel ratio afw$_{(i-1)}$ in the calculation of the basic amount of fuel injection qbased, and hence the eventual amount of fuel injection qinjd, for compression stroke split injection is that if the latest value of eventual target air-to-fuel ratio afw$_{(i)}$ (a value immediately before compression stroke split injection) is employed, the combustion mode and air-to-fuel ratio possibly fluctuate between intake and compression stroke split injection, which leads to loss of coordination.

Figure 14B:
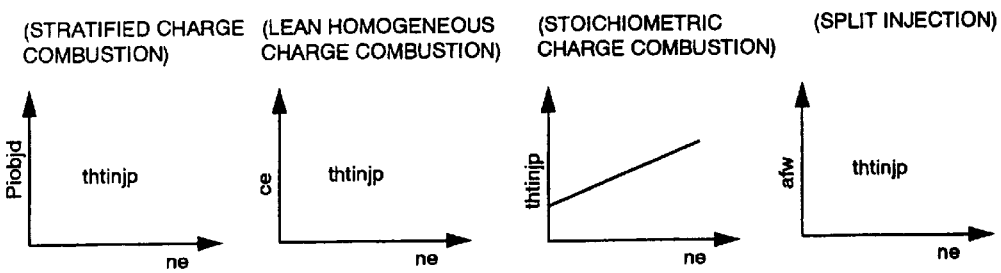

The injection timing control means 66 determines a fuel injection timing by combustion mode. As shown in FIG. 14B, in the stratified charge combustion mode, a fuel injection timing thtinjd for compression stroke injection is obtained from a fuel injection timing control map defined with second target indicated mean effective pressure Piobjd and engine speed ne provided for the stratified charge combustion mode. Similarly, in the lean homogeneous charge combustion mode, a fuel injection timing thtinjp for intake stroke injection is obtained from a fuel injection timing control map defined with actual air charging efficiency ce and engine speed ne provided for the homogeneous lean combustion mode. Further, in the stoichiometric homogeneous charge combustion mode, a fuel injection timing thtinjp for intake stroke injection is obtained according to actual air charging efficiency ce from a table. In this instance, as an expedient for calculation, some values are always assigned for these fuel injection timings thtinjd. For example, in the stratified charge combustion mode, while a value on the fuel injection timing control map is assigned for the fuel injection timing thtinjd for compression stroke injection, a fixed value is assigned for the fuel injection timing thtinjd for intake stroke injection. However, since the split ratio for the intake stroke split injection rqbasep is fixed to 0% in the stratified charge combustion mode, the intake stroke injection is not in any way executed. In the lean homogeneous charge combustion mode or the stoichiometric homogeneous charge combustion mode, while a value on the fuel injection timing control map or the fuel injection timing control table is assigned for the fuel injection timing thtinjd for intake stroke injection, a fixed value such as a specific early time in a compression stroke is assigned for the fuel injection timing thtinjd for compression stroke injection for making an additional injection to supply a deficiency in the intake stroke. Further, in the split injection mode, while the utilization is made of the fuel injection timing thtinjd for compression stroke injection in the stratified charge combustion mode, a value on the fuel injection timing control map defined with eventual target air-to-fuel ratio afw and engine speed ne is assigned for the fuel injection timing thtinjd for intake stroke injection.

Fuel injection control means 67 performs pulsing the fuel injector 22, or energizing a solenoid causing the fuel injector, to open for a time corresponding to the injection pulse width Ti determined in the injection pulse width determining means 65*d*.

Figure 14C:
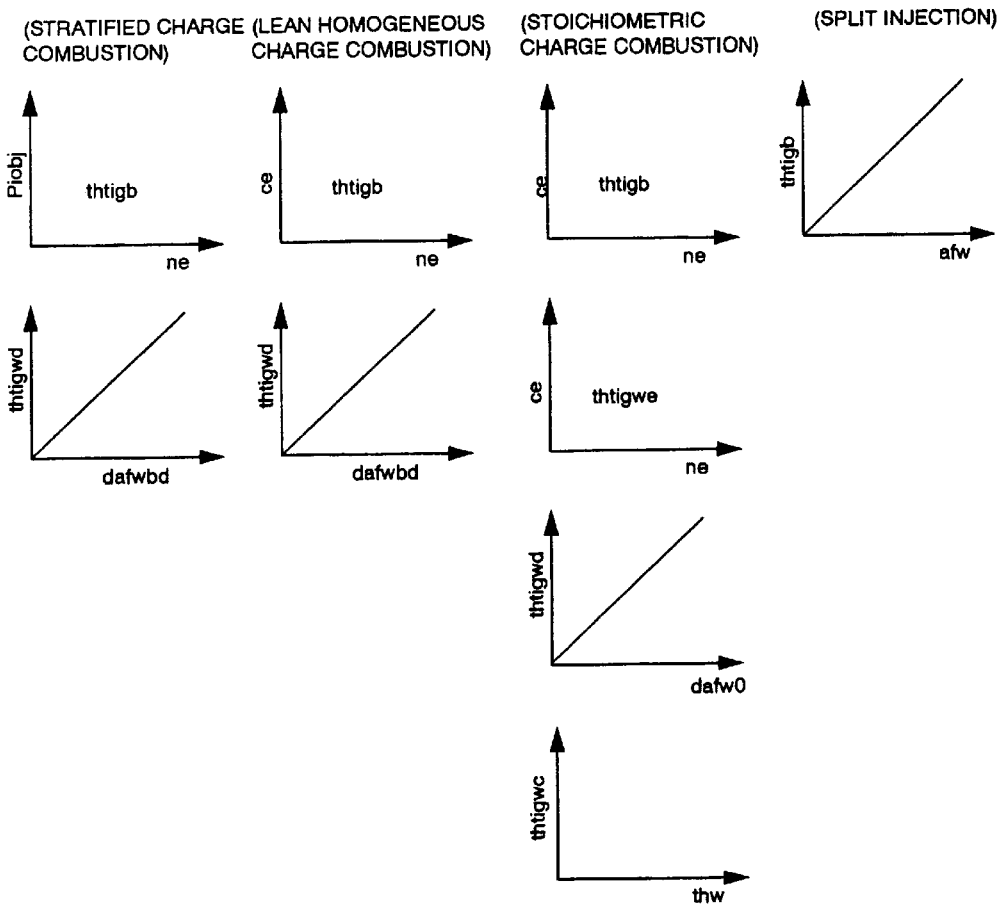

Ignition timing is controlled through functional means 68 for determining a basic ignition timing and ignition timing correction values and functional means 69 for determining an eventual ignition timing based on the basic ignition timing and ignition timing correction values. The basic ignition timing determining means 68 determines a basic ignition timing thtigb and various correction values necessary to determine an eventual ignition timing. Specifically, as shown in FIG. 14C, in the stratified charge combustion mode, a basic ignition timing thtigb is obtained from a basic injection timing control map defined with second target indicated mean effective pressure Piobjd and engine speed ne provided for the stratified charge combustion mode, and an A/F related correction value thtigwd is obtained from a correction value control table defined with target air-to-fuel ratio difference dafwbd of the target air-to-fuel ratio afwbd from the eventual target air-to-fuel ratio afw. While the basic ignition timing thtigb is determined according to a second target indicated mean effective pressure Piobjd and an engine speed ne at a target air-to-fuel ratio afwbd in an ordinary operating state, the A/F related correction value thtigwd, whereas, since, in the transitional operating state, the target air-to-fuel ratio afw0 is taken as the eventual target air-to-fuel ratio afw and in consequence there is brought about a difference of air-to-fuel ratio, this correction according to the target air-to-fuel ratio difference dafwbd (=afwbd–afw) is used to adjust the ignition timing so as to balance the air-to-fuel ratio difference. Similarly, in the lean homogeneous charge combustion mode, a basic ignition timing thtigb is obtained from a basic injection timing control map defined with actual air charging efficiency ce and engine speed ne provided for the lean homogeneous charge combustion mode, and an A/F related correction value thtigwd is obtained from a correction value control table defined with target air-to-fuel ratio difference dafwbd. Further, in the stoichiometric charge combustion mode, a basic ignition timing thtigb is obtained from a basic injection timing control map defined with actual air charging efficiency ce and engine speed ne provided for the stoichiometric homogeneous charge combustion mode. Correction values for the basic ignition timing thtigb, namely an EGR related correction value thtigwe used during execution of exhaust gas recirculation, an A/F related correction value thtigwd according to a target air-to-fuel ratio difference dafw0 and a temperature related correction value thtigwc used during cold engine operation according to engine coolant temperature thw. The EGR related correction value thtigwe is obtained from a correction value control map defined with actual air charging efficiency ce and engine speed ne. The A/F related correction value thtigwd is obtained from a correction value control table defined with target air-to-fuel ratio difference dafwb0. The temperature related correction value thtigwc is obtained from a correction value control table defined with engine coolant temperature thw. This correction according to the target air-to-fuel ratio difference dafwbd (=afwbd–afw) is executed to adjust the ignition timing so as to balance a torque change in the event the eventual target air-to-fuel ratio afw is made stoichiometric in order to avoid that the target air-to-fuel ratio afw0 changes to a specified one on the lean side lower than the stoichiometric air-to-fuel ratio via one which provides an increased amount of NOx emission as will be described later. In the split injection mode, a basic ignition timing thtigb is obtained from a basic injection timing control table defined with eventual target air-to-fuel ratio afw.

Based on these basic ignition timing and various correction values, an eventual ignition timing is given by the following expression (3):

$$thtig = thtigb - (thtigwd + thtigwe + thtigwc) \qquad (3)$$

Figure 7:
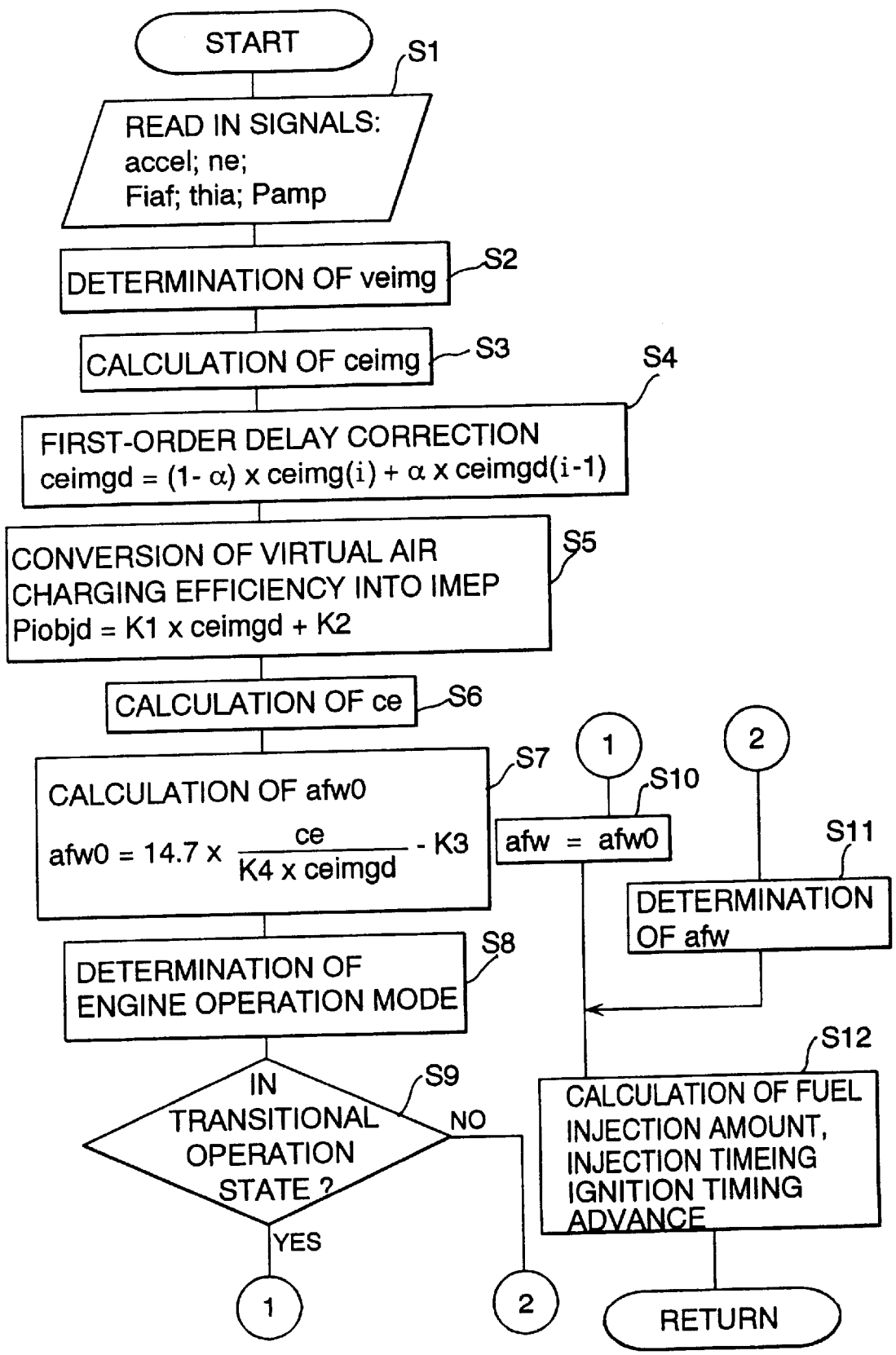
FIG. 7 is a flow chart illustrating a fuel injection control sequence routine for a microcomputer of the engine control unit.

FIG. 7 is a flow chart illustrating a sequence routine of the fuel injection control described above for the microcomputer of PCM 50. When the flow chart logic commences and control proceeds directly to a function block at S1 where signals from the sensors 42–45 and 26 representative of an engine speed ne, an accelerator pedal travel accel, an intake air temperature thia, an atmospheric pressure Pamp and an intake air flow rate Fiaf are read in. After determining a virtual volumetric efficiency veimg according to the accelerator pedal travel accel and the engine speed ne with reference to a virtual volumetric efficiency map shown by way of example in FIG. 9 at step S2, a virtual air charging efficiency ceimg is determined based on the virtual volumetric efficiency veimg corrected according to an intake air density which is calculated based on the intake air temperature thia and the atmospheric pressure Pamp in the intake air density monitoring means 51 at step S3, and then a first-order delay correction is performed to provide a tempered virtual air charging efficiency ceimgd at step S4. The tempered virtual air charging efficiency ceimgd is given by the following expression (4).

$$ceimgd = (1-\alpha) \times ceimg + \alpha \times ceimgd_{(i-1)} \tag{4}$$

where the tempered virtual air charging efficiency ceimgd followed by an affix (i−1) is the last value thereof, and α (0<α<1) is the filtering factor.

Subsequently, the tempered virtual air charging efficiency ceimgd is converted into a second target indicated mean effective pressure (IMPE) Piobjd which is given by the following expression (5) at step S5.

$$Piobjd = K1 \times ceimgd + K2 \tag{5}$$

where K1 and K2 are conversion factors.

In this instance, in the event where the engine is loaded by, for example, an air conditioner, the second target indicated mean effective pressure Piobjd may be calculated after a correction of the tempered virtual air charging efficiency ceimgd added by an idling load correction value.

After calculating an actual air charging efficiency ce based on the intake air flow rate Fiaf at step S6, a target air-to-fuel ratio afw0 for fuel injection control is calculated based on the ratio the actual air charging efficiency ce to the tempered virtual air charging efficiency ceimgd or the second target indicated mean effective pressure Piobjd at step S7. In this calculation, an improvement ratio of fuel consumption at a stoichiometric air-to-fuel ratio which is provided while the target air-to-fuel ratio is changed toward a lean side is added. That is, the target air-to-fuel ratio afw0 is given by the following expression (6).

$$afw0 = 14.7 \times ce/(K4 \times ceimgd) - K3 \tag{6}$$

or $$afw0 = 14.7 \times K1 \times ce/\{(K4 \times (ceimgd\ Piobjd - K2)\} - K3$$

where K3 and K4 are fuel consumption improving factors.

Subsequently, after determining a combustion mode is determined according to the target air-to-fuel ratio afw0 for fuel injection control at step S8, a judgement is made at step S9 as to whether the engine is in a transitional operating state. In this instance, the engine is determined to be in the transitional operating state when a specified threshold value is exceeded by a target air-to-fuel ratio difference dafwbd between the target air-to-fuel ratios afwbd and afw0, or to be in an ordinary operating state when the specified threshold value is not exceeded by a target air-to-fuel ratio difference dafwbd. In the transitional operating state, the target air-to-fuel ratio afw0 for fuel injection control is taken as an eventual target air-to-fuel ratio afw at step S10. On the other hand, during the ordinary operating state, a target air-to-fuel ratio afwbd determined with reference to the target air-to-fuel ratio control map shown by way of example in FIG. 14A is taken as an eventual target air-to-fuel ratio afw at step S11. Finally, at step S12, an amount of fuel injection, an injection timing and an ignition timing are determined based on the engine speed ne, the eventual target air-to-fuel ratio afw, the tempered virtual air charging efficiency ceimgd and the second target indicated mean effective pressure Piobjd in consideration of the combustion mode by the manner described previously.

Figure 8:
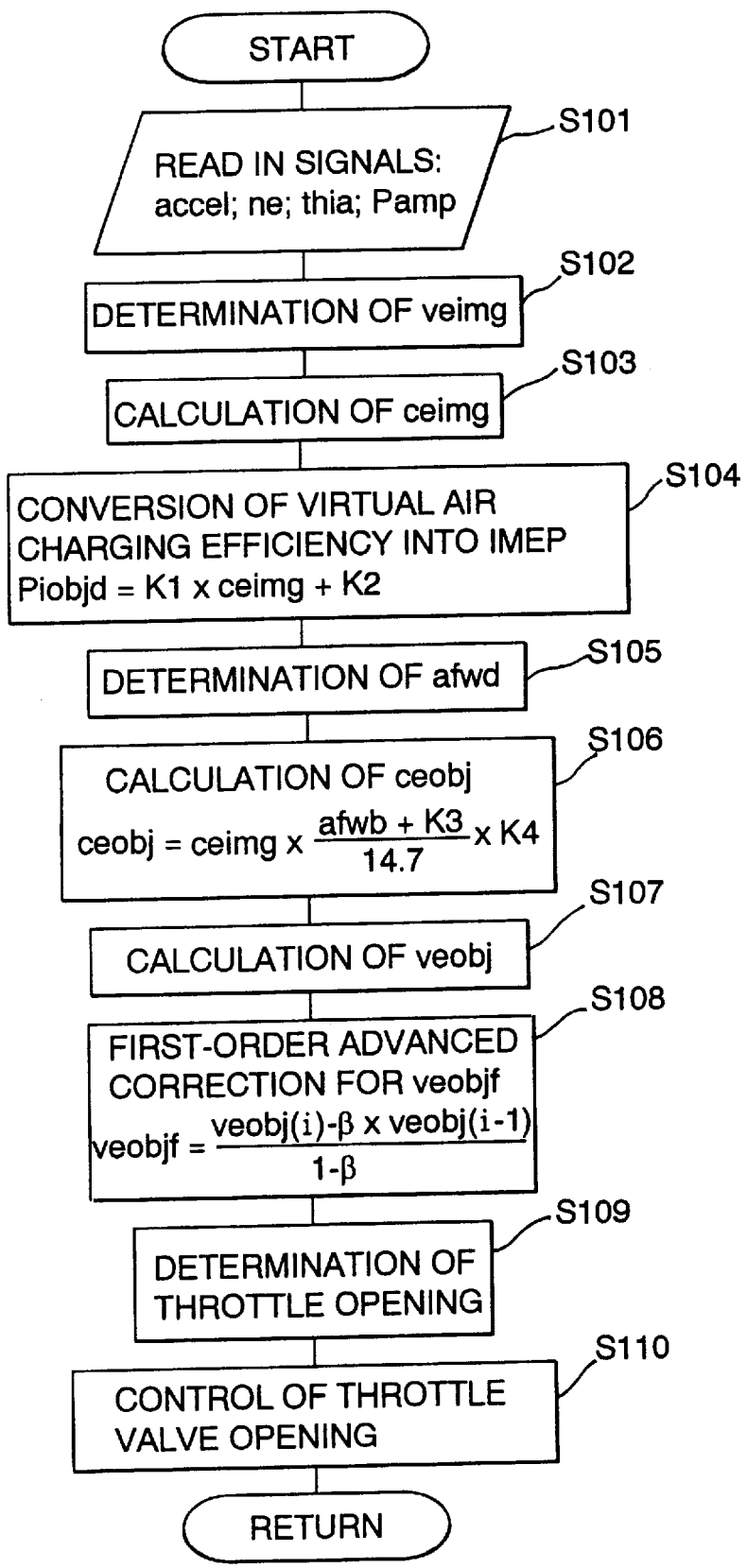
FIG. 8 is a flow chart illustrating an intake air control sequence routine for the microcomputer of the engine control unit.

FIG. 8 is a flow chart illustrating a sequence routine of the throttle opening control described abobe for the microcomputer of PCM 50. When the sequence logic commences and control proceeds to a function block at S101 where signals from the sensors 42–45 representative of an engine speed ne, an accelerator pedal travel accel, an intake air temperature thia and an atmospheric pressure Pamp are read in. After determining a virtual volumetric efficiency veimg according to the accelerator pedal travel accel and the engine speed ne with reference to a virtual volumetric efficiency map shown by way of example in FIG. 9 at step S102, a virtual air charging efficiency ceimg is determined based on the virtual volumetric efficiency veimg corrected according to an intake air density which is calculated based on the intake air temperature thia and the atmospheric pressure Pamp in the intake air density monitoring means 51 at step S103, and then the virtual air charging efficiency ceimg is converted into a first target indicated mean effective pressure Piobj which is given by the following expression (7) at step S 104.

$$Piobj = K1 \times ceimg + K2 \tag{7}$$

where K1 and K2 are conversion factors.

In this instance, in the event where the engine is loaded by, for example, an air conditioner, the first target indicated mean effective pressure Piobj may be calculated after a correction of the virtual air charging efficiency ceimg added by an idling load correction value.

Subsequently, at step S105, a target air-to-fuel ratio afwb for intake air control is determined with reference to the target air-to-fuel ratio control map provided for a combustion mode that is determined according to the first target indicated mean effective pressure Piobj and the engine speed ne with reference to the combustion mode map as shown by way of example in FIG. 10. As previously described, as shown in FIG. 11A, the target air-to-fuel ratio afwb is determined according to first target indicated mean effective pressure Piobj and the engine speed ne in the stratified charge combustion mode or in the lean homogeneous charge combustion mode, or is set to a stoichiometric value in the stoichiometric charge combustion mode. Further, at step S106, a target air charging efficiency ceobj is calculated based on the target air-to-fuel ratio afwb and the virtual air charging efficiency ceimg, which is given by the following expression (8).

$$ceobj = ceimg \times \{(afwb + K3)/14.7\} \times K4 \tag{8}$$

As will be described later, the expression (8) is formulated to calculate the target air charging efficiency ceobj by filtering with an improvement ratio of fuel consumption and an air excess ratio for a stoichiometric air-to-fuel ratio which is provided during lean charge combustion to the virtual air charging efficiency ceimg. The first target indicated mean effective pressure Piobj may be used as a substitute for the virtual air charging efficiency ceimg in the expression (8). That is, the virtual air charging efficiency ceimg is given by deforming the expression (7) to ceimg=(Piobj−K1)/K2.

After determining a target volumetric efficiency veobj based on the virtual air charging efficiency ceimg corrected according to the intake air temperature thia and the atmospheric pressure Pamp at step S107, a first-order advance correction is performed to provide a corrected target volumetric efficiency veobjf at step S108. The corrected target volumetric efficiency veobj is given by the following expression (9).

$$veobjf=\{veobj_{(i)}-\beta veobj_{(i-1)}\}/(1-\beta) \quad (9)$$

where β is a correction factor (0<β<1).

This first-order advance correction is made to allow a subsequent change in the target volumetric efficiency veobj in order to relieve the control of a delay in response. Accordingly, if the latest value veobj(i) is corrected to increase if it has increased from the last target volumetric efficiency veobj(i−1) or to decrease if it has decreased from the last target volumetric efficiency veobj(i−1).

At step S109, a target throttle opening tvoobj is determined according to the corrected target volumetric efficiency veobjf and the engine speed ne with reference to a throttle opening control map selected according to whether the exhaust gas recirculation is enforced. When the exhaust gas recirculation is enforced, the target throttle opening tvoobj is further corrected according to the target burned gas volume ratio rveegrobj. Finally, at step S110, the throttle valve 28 is controlled to attain the target throttle opening tvoobj.

According to the engine control system, a combustion mode is determined according to target indicated mean effective pressure, i.e. target engine loads, and engine speeds and air-to-fuel ratio, the amount of intake air and the amount of fuel injection are controlled according to these target indicated mean effective pressure and engine speed with control parameters peculiar to the combustion mode. A direct injection-spark injection type engine is operative in three modes, ie. the stratified charge combustion mode, the lean homogeneous charge combustion mode and the stoichiometric charge combustion mode, according to engine operating conditions when controlled by the engine control system. In the stratified charge combustion mode, compression stroke injection is performed to control an air-to-fuel ratio so as to distribute a fuel mixture extremely leaner than a stoichiometric ratio unevenly around the spark plug 20 with an effect of significantly improving fuel consumption. In the lean homogeneous charge combustion mode, intake stroke injection is performed and a fuel mixture is made as lean as possible to burn. Because it is necessary to open the throttle valve to increase the amount of intake air so as thereby to make a fuel mixture lean as well as securing required torque in these combustion modes, while the amount of intake air is controlled according to target loads and so forth by combustion mode, the amount of fuel injection is controlled according to target air-to-fuel ratios provided separately from that for intake air control. That is, in the control of intake air, a target throttle opening tvoobj is determined on the basis of a target air-to-fuel ratio afwb for intake air control prescribed by combustion mode, and the throttle valve is controlled to attain the target throttle opening tvoobj. On the other hand, in the control of the amount of fuel injection, an eventual target air-to-fuel ratio afw for fuel injection control is determined, and the amount of fuel injection is controlled on the basis of the eventual target air-to-fuel ratio a)W and actual air charging efficiency ce so as to bring an eventual air-to-fuel ratio to the eventual target air-to-fuel ratio afw. In this instance, while the engine is in a transitional operating state, a target air-to-fuel ratio afw0 for fuel injection control is taken as an eventual target air-to-fuel ratio afw. Because this target air-to-fuel ratio afw0 is determined on the basis of a value corresponding to a target load and an actual air charging efficiency ce, the output torque is property controlled according to the target load even in the event where there occurs a delay of a change in the amount of intake air in response to a change in target load, as will be described later.

Figure 15:
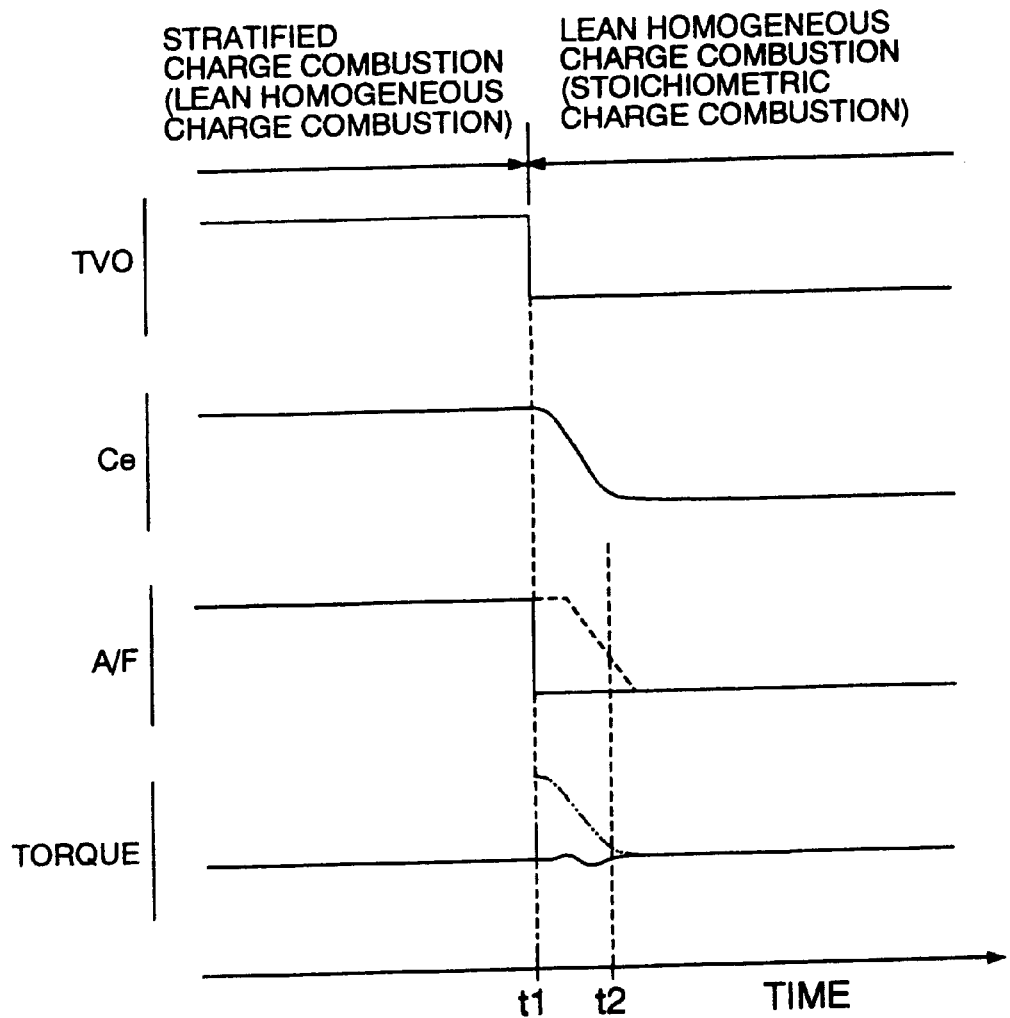
FIG. 15 is a time table of changes in throttle opening, air charging efficiency, air-fuel ratio and output torque during a switch of engine operation mode.

FIG. 15 shows changes in throttle opening (TVO), actual air charging efficiency (Ce), air-to-fuel ratio (A/F) and torque at a transition from the stratified charge combustion mode to the lean homogeneous charge combustion mode or vide versa due to a change in target load such as a change in accelerator pedal travel. At a transition from the stratified charge combustion mode to the lean homogeneous charge combustion mode or from the lean homogeneous charge combustion mode to the stoichiometric charge combustion mode, the target air-to-fuel ratio afwb for intake air control changes to the rich side (the side of lower air-to-fuel ratio) in response to the transition as shown by a solid line in FIG. 15, and the throttle opening becomes as small as balancing a change of the target air-to-fuel ratio afwb. In this event, since a change in the amount of intake air is accompanied by a delay in responding to a change in throttle opening, a certain time is needed before the actual air charging efficiency ce becomes as low as balancing the target air-to-fuel ratio afwb after entering the lean homogeneous charge combustion mode or the stoichiometric charge combustion mode. If the target air-to-fuel ratio is determined likewise for both intake air control and fuel injection control as conventionally, the amount of intake air is controlled according to a target air-to-fuel ratio after a transition of combustion mode (which is more rich as compared with that before the transition of combustion mode) before the actual air charging efficiency ce decreases sufficiently, causing a momentary rise in output torque due to an increase in the amount of fuel injection as shown by double dotted broken line, which leads to torque fluctuations.

By contrast, in the engine control system of the invention, the target air-to-fuel ratio afw0 for fuel injection control, which is given by the expression (6), is determined according to a ratio of an actual air charging efficiency ce to a tempered virtual air charging efficiency ceimgd or a second target indicated mean effective pressure Piobjd. Accordingly, the target air-to-fuel ratio afw0 is controlled according to a change in actual air charging efficiency ce as shown by a broken line so as to provide output torque balancing the target load, which results in a stable output torque even during the transition of combustion mode and preventing an occurrence of a torque shock.

In the combustion mode determining means 63 for determining combustion mode for controlling the fast response group of control parameters, combustion modes are established according to target air-to-fuel ratio afw0 for fuel injection control as shown in FIG. 13, and substantive control of operation, i.e. changing injection timing and ignition timing, is performed according to the combustion modes. Therefore, a time t2 at which a substantive mode change occurs is delayed from the time t1 of a mode change determined by the basic combustion mode determining means 53 until the actual air charging efficiency ce and the target air-to-fuel ratio afw0 reach closely those after the transition of combustion mode. In consequence, the engine control system prevents aggravation of combustibility due to a switch to intake stroke injection when the air-to-fuel ratio remains lean closely to those for the stratified charge combustion mode upon an occurrence of a transition, for example, from the stratified charge combustion mode, combustion is property made even during the transition of combustion mode. Further, the control of output torque is property performed as the target air-to-fuel ratio afw0 given by the expression (6) is filtered with an improvement ratio of fuel consumption due to a change thereof toward a lean side. The control of intake air according to air-to-fuel ratios is effectively performed as the target air charging efficiency ceobj is determined in consideration of an improvement ratio of fuel consumption. The effect of tempering with the improvement ratio of fuel consumption to the target air-to-fuel ratio and to the target air charging efficiency ceobj will be described later.

Figure 16:
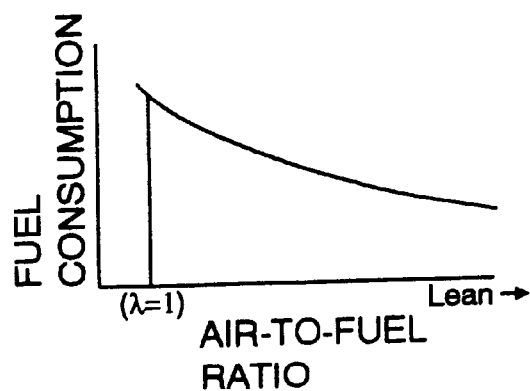
FIG. 16 is a graph showing the relationship between fuel consumption and air-fuel ratio.

FIG. 16 shows the relationship between air-to-fuel ratio and fuel consumption. As shown in the figure and has been known in the art, the fuel consumption is improved owing to an increase in thermal efficiency as compared with that with the stoichiometric ratio as the air-to-fuel ratio changes toward the lean side from a stoichiometric ratio in the extent where thermal stability is maintained.

Figure 18:
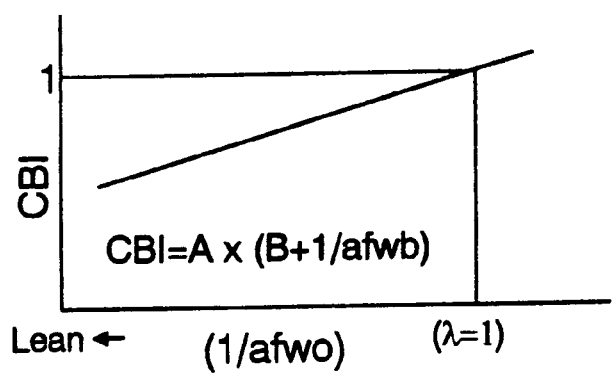
FIG. 18 is a graph showing the relationship between air-fuel ratio and fuel flow coefficient.

FIG. 18 shows the relationships of air charging efficiency Ce, fuel flow rate and output torque to air-to-fuel ratio. Each of air charging efficiency Ce, the fuel flow rate and the output torque shown by a broken line is one that is provided when the amount of intake air is controlled by tempering with an air excess ratio only for the air-to-fuel ratio which is determined to be higher than the stoichiometric ratio. Specifically, when a target air charging efficiency ceobj is determined a virtual air charging efficiency ceimg tempered with an air excess ratio only for a target air-to-fuel ratio afwb, it is given by the following expression (10).

$$ceobj = ceimg \times afwb/14.7 \quad (10)$$

As apparent, as the target air-to-fuel ratio afwb changes toward the lean side, while the air charging efficiency increases with a rate corresponding to the air excess ratio, the amount of fuel injection does not increase. However, the output torque shows an increase ΔT corresponding to an improvement ratio of fuel consumption as compared with that at the stoichiometric ratio.

By contrast, as shown in FIG. 18, when determining the target air charging efficiency ceobj by using a fuel flow rate coefficient CBI so as to balance the improvement of fuel consumption, the target air charging efficiency ceobj is given by the following expression (11).

$$ceobj = ceimg \times (afwb/14.7) \times CBI \quad (11)$$

Figure 17:
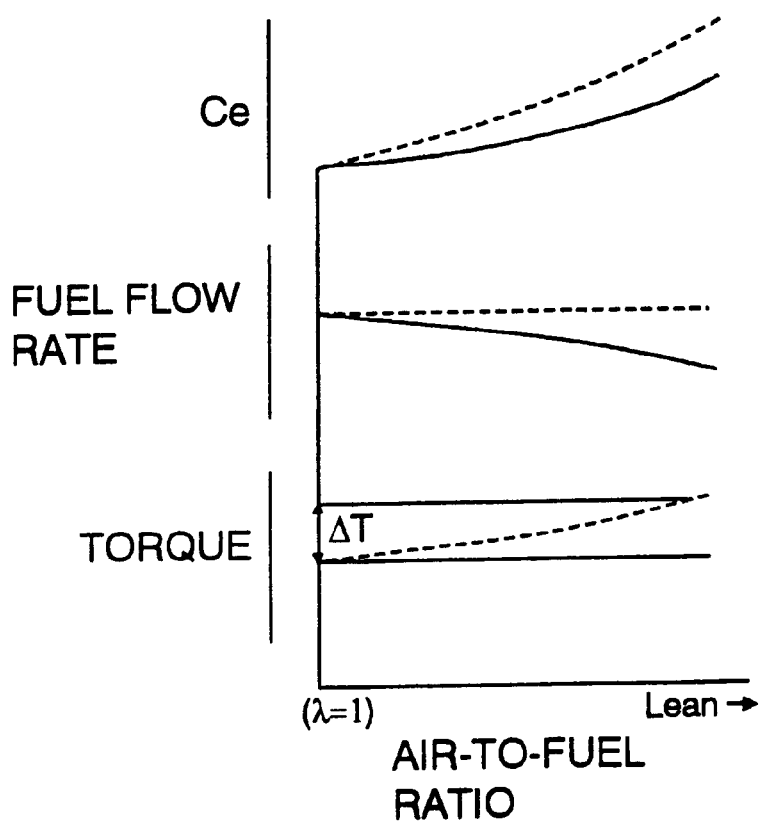
FIG. 17 is a graph showing changes in air charging efficiency, the amount of fuel injection and output torque while controlling the amount of intake air according to air-fuel ratio.

In this case, as shown by a solid line in FIG. 17, the change rate of air charging efficiency according to a change in air-to-fuel ratio toward the lean side is smaller than that provided when the amount of intake air is controlled by tempering with an air excess ratio only for the air-to-fuel ratio which is determined to be higher than the stoichiometric ratio which is shown by a broken line, and the fuel flow rate drops with a change in air-to-fuel ratio toward the lean side. An increase in output torque resulting from the improvement of fuel consumption is cancelled by a drop of the fuel flow rate, so that the output torque is maintained at a level over air-to-fuel ratios on the lean side from the stoichiometric ratio. Accordingly, the output torque is controlled correspondingly to target loads.

The fuel flow rate coefficient CBI changes according to air-to-fuel ratios and is given by the following linear function of the reciprocal of the target air-to-fuel ratio afwb (12).

$$CBI = A \times (B + 1/afwb) \quad (12)$$

With the substitution of CBI, the expression (11) can be rewritten as follows:

$$ceobj = ceimg \times (afwb 14.7) \times A \times (B + 1/afwb) \quad (13)$$

Letting K3 and K4 be 1/B and A×B, respectively, the expression (13) can be rewritten and rearranged as the expression (8). This indicates that the expression (8) is gained by rewriting and rearranging the expression (11) with substitutions of K3 and K4 for CBI. Because the expression (6) is gained by rewriting the expression (8) with substitutions of actual air charging efficiency ce and target air-to-fuel ratio afw0 for fuel injection control for target air charging efficiency ceobj and target air-to-fuel ratio afwb for intake air control, respectively, and accordingly tempering with the improvement of fuel consumption, the output torque is prevented from changing due to the improvement of fuel consumption provided by a change in air-to-fuel ratio.

By the way, according to the embodiment described above, the target air-to-fuel ratio determining means 62 comprises the functional means 62a, 62b, 62c and 62d for determining a target air-to-fuel ratio afw0 for fuel injection control, a target air-to-fuel ratio afwbd for an ordinary operation state, air-to-fuel ratio difference dafwb, and an eventual target air-to-fuel ratio afw, respectively, the engine control system provides an advantage of reducing a NOx emission level as well as performing property the air-to-fuel ratio control. Specifically, for example, upon a occurrence of a transition to the stoichiometric charge combustion mode from the lean homogeneous charge combustion, the target air-to-fuel ratio afw0 for fuel injection control gradually changes toward the rich side with a change in air charging efficiency. In such an event, while the target air-to-fuel ratio afw0 is taken as an eventual target air-to-fuel ratio afw when the air-to-fuel ratio difference dafwb is large and the stoichiometric air-to-fuel ratio (the target air-to-fuel ratio afwbd) is taken as an eventual target air-to-fuel ratio afw when the target air-to-fuel ratio afw0 for fuel injection control becomes smaller than a specified ratio of, for example, approximately 17 and then the air-to-fuel ratio difference dafwb from the target air-to-fuel ratio afwbd becomes small. Accordingly, while the target air-to-fuel ratio afw0 is controlled to change the output torque changes relative to engine load as smoothly as possible, the level of a NOx emission is lowered because the target air-to-fuel ratio afw0 is prevented from changing to a specified one on the lean side lower than the stoichiometric air-to-fuel ratio via an air-to-fuel ratio of, for example, approximately 16 which provides an increase in NOx emission.

Ignition timing is property adjusted according to a change in air-to-fuel ratio. During a transition to the stoichiometric charge combustion mode from the lean homogeneous charge combustion mode, the ignition timing thtigb is corrected with a correction value thtigwd related to the target air-to-fuel ratio difference dafwbd while the engine operation state remains in the lean homogeneous charge combustion mode as shown in FIG. 14C, so that the air-to-fuel ratio is property controlled toward the eventual target air-to-fuel ratio afw. Further, the ignition timing thtigb is corrected for retardation with a correction value thtigwd related to the target air-to-fuel ratio difference dafw0 immediately after a transition to the stoichiometric charge combustion mode which is accompanied by a sharp change in target air-to-fuel ratio to a stoichiometric air-to-fuel ratio from a specified air-to-fuel ratio as shown in FIG. 14C, so that the output torque is regulated without sharply changing.

When controlling various control parameters on the basis of target indicated mean effective pressure and so forth, the first target indicated mean effective pressure Piobj is used for the control of the amount of intake air which is slow in response to a control signal, and the second target indicated mean effective pressure Piobjd determined on the basis of tempered virtual air charging efficiency ceimgd is used for the control of the amount of fuel injection which is a fast group ofcontrol parameter. In consequence, the control parameters are timely adjusted to be in readiness. Specifically, in general engines in which throttle opening changes correspondingly to accelerator pedal travels while maintaining the standard operating condition in which the air-to-fuel ratio is stoichiometric over the most part of operating zone, the amount of intake air increases after a delay even when a quick change in accelerator pedal travel, and hence in throttle opening, occurs during acceleration. Since a change in output torque corresponds to a change in the amount of intake air, in order to control the output torque in imitation of the change in the amount of intake air, the second target indicated mean effective pressure Piobjd determined on the basis of the tempered virtual air charging efficiency ceimgd is adequate to an actually required target load. Therefore, by controlling the fast response froup of control parameters according to the second target indicated mean effective pressure Piobjd corresponding to the actually required target load, there is provided the characteristic of output torque likewise in the case of operating under the standard operating condition, so as thereby to prevent a sharp change in output torque and to assure a comfortable drive feeling.

On the other hand, throttle valve, EGR valve and swirl control valve, which are slow response group of control parameters, provide changes in the amount of intake air, the recirculation amount of exhaust gas and the swirl ratio, respectively, relative to a change in target load after a certain delay, in other words, these control values tends to be slow in their changes relatively to a change in virtual air charging efficiency ceimg. Therefore, they are controlled according to the first target indicated mean effective pressure Piobj determined on the basis of virtual air charging efficiency ceimg which is before tempering. Further, the first-order advance correction of target volumetric efficiency veobjf based on which a target throttle opening tvoobj is determined is made in the throttle opening control shown in FIG. 8, decreasing the delay in response of the control of the amount of intake air, so as thereby to prevent or significantly reduce a timing lag of the control of the amounts of intake air and fuel injection.

In the case where the catalyst 35 is of a NOx adsorbing type, since the NOx adsorbing catalyst is saturated to lower its NOx adsorbing ability when a lean-burn state such as the stratified charge combustion mode lasts for a long period of time, it is generally required to perform what is called a rich spike treatment for catalyzing reduction of NOx to remove the NOx by temporarily making an air excess ratio $\Delta$ representing the air-to-fuel ratio equal to or smaller than 1 ($\Delta \leq 1$) while a lean-burn state lasts for a specified period of time. However, the engine control system of this embodiment is able to easily perform the rich spike treatment by controlling the target air-to-fuel ratio afwb for intake air control only for a specified period of time. Specifically, when using the stoichiometric air-to-fuel ratio as a target air-to-fuel ratio afwb for intake air control for a specified period of time while a lean-burn state lasts for a specified period of time, the target throttle opening tvoobj determined in the throttle opening determining means 56 is correspond-ingly made small to reduce the amount of intake air. With a change in actual air charging efficiency ce following the reduction in the amount of intake air, the target air-to-fuel ratio afw0 for fuel injection control which is determined in the target air-to-fuel ratio determining means 62a reaches the stoichiometric air-to-fuel ratio, achieving the rich spike treatment while controlling the output torque so as to balance a target load.

Figure 19:
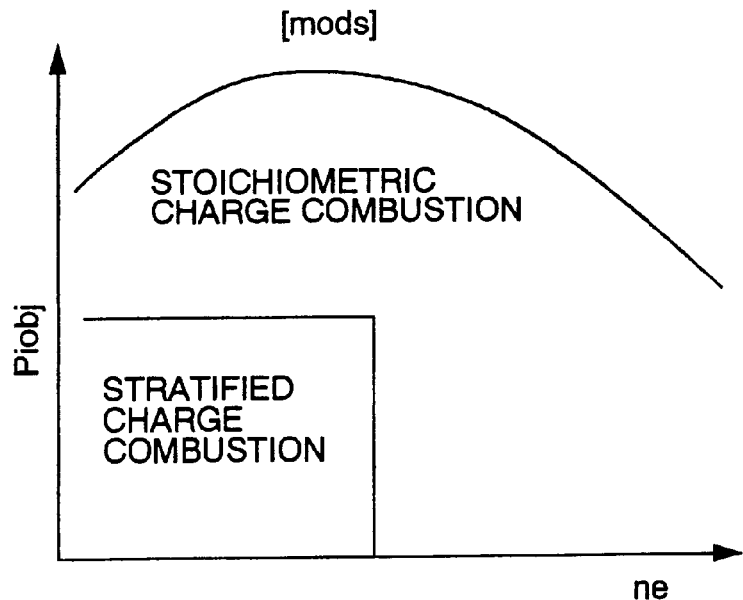
FIG. 19 is a diagram showing engine operating zones for various engine operation modes according to another embodiment of the invention.
Figure 20:
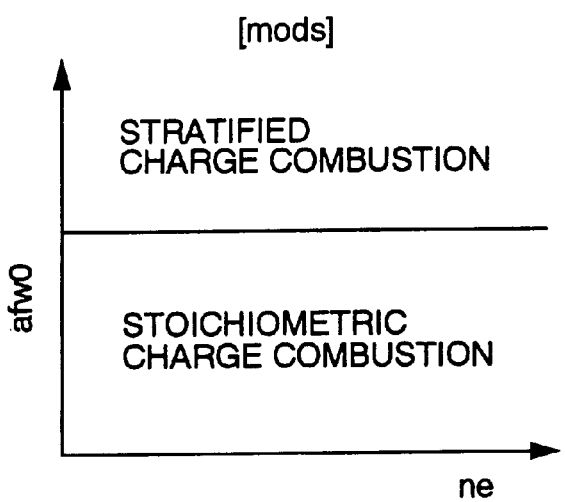
FIG. 20 is a diagram showing engine operating zones for various engine operation modes for fuel injection control according to the other embodiment of the invention.

The lean homogeneous combustion mode may be omitted. In this instance, determination of a combustion mode in the engine operation mode determining means 53 is made with reference to a combustion mode map shown in FIG. 19 in place of that shown in FIG. 10. The combustion mode map defines a stratified charge combustion mode for an engine operating zone of lower speeds and lower loads and a stoichiometric charge combustion mode for an engine operating zone of higher speeds and higher loads. The maps for the lean homogeneous charge combustion mode shown in FIGS. 11 and 14 are unnecessary to control throttle opening EGR valve lift, swirl valve opening, the amount of fuel injection, fuel injection timing and ignition timing in PCM 50. Further, determination of a combustion mode in the engine operation mode determining means 63 is made with reference to a combustion mode map shown in FIG. 20 in place of that shown in FIG. 13. The combustion mode map defines a stratified charge combustion mode for an engine operating zone of target air-to-fuel ratios afw0 for fuel injection control higher than a specified air-to-fuel ratio on the lean side of a zone in which NOx are easily formed and a stoichiometric charge combustion mode for an engine operating zone of target air-to-fuel ratios afw0 for fuel injection control lower than the specified air-to-fuel ratio. The target air-to-fuel ratio determining means 62a changes an eventual target air-to-fuel ratios afw to the stoichiometric air-to-fuel ratio at one stretch from a specified air-to-fuel ratio when the target air-to-fuel ratios afw0 lowers to the specified air-to-fuel ratio during a transition to the stoichiometric charge combustion mode from the stratified charge combustion mode. In the stratified charge combustion state in particular, since a fuel mixture is partly distributed with an air-to-fuel ratio for easy combustion around the spark plug 20 even while it is generally lean over the entire combustion chamber, the air-to-fuel ratio at which NOx are easily formed tends to shift toward the lean side as compared with the homogeneous charge combustion state. In consideration of this point, the combustion mode map shown in FIG. 20 the boundary target air-to-fuel ratios afw0 between the two combustion modes is preferably set to an air-to-fuel ratio of between approximately 19 and 20 which are relatively close to the lean side. In this instance, though the air-to-fuel ratio changes relatively sharply during a transition to the stoichiometric charge combustion mode from the stratified charge combustion mode, the ignition timing thtigb is corrected for retardation with a correction value thtigwd related to the target air-to-fuel ratio difference dafw0 as shown in FIG. 14C, property controlling the output torque. The control during such a combustion mode transition will be described in detail with reference to FIG. 21.

Figure 21:
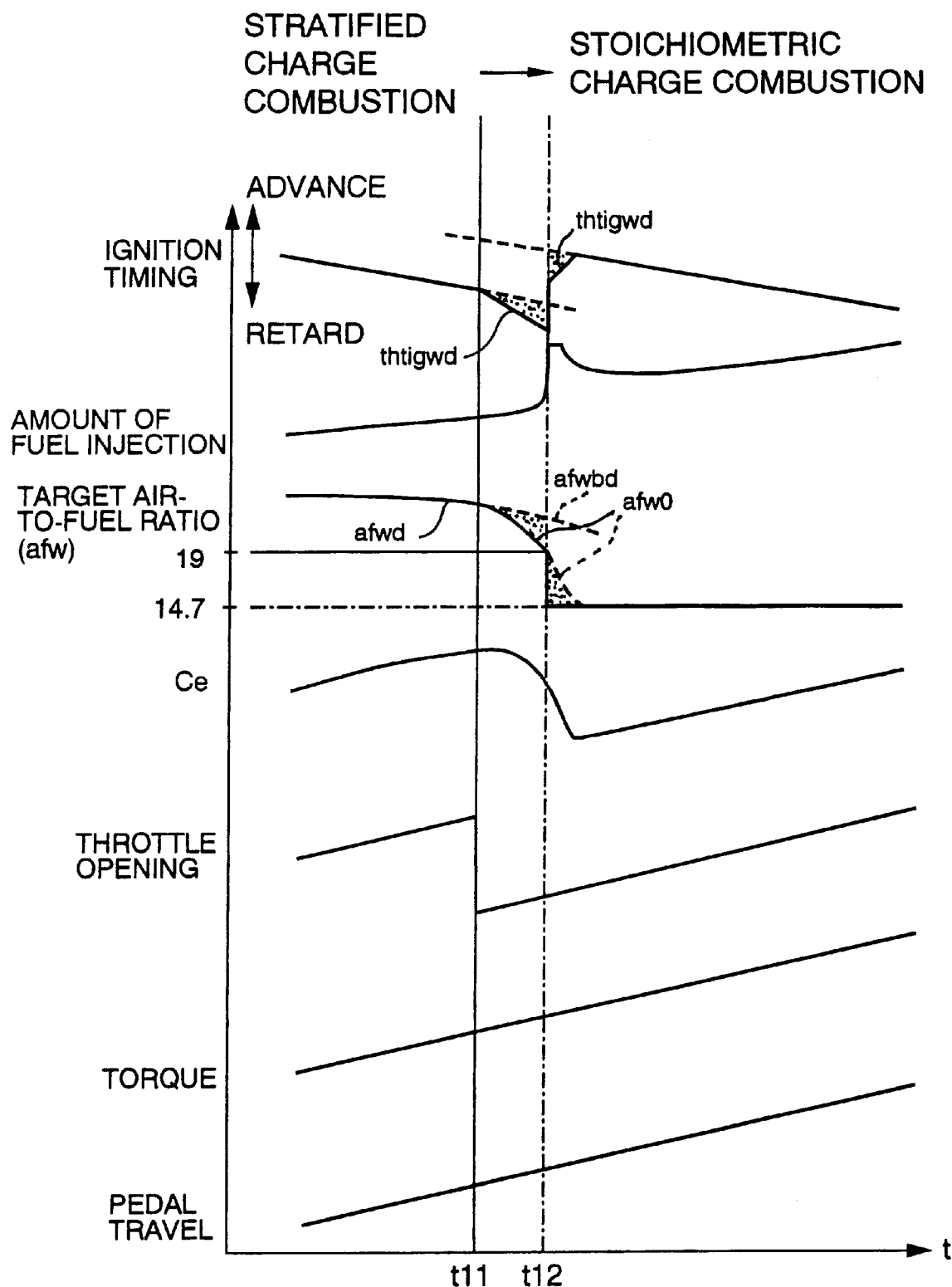
FIG. 21 is a time table of changes in various control parameters during a switch of engine operation mode.

As shown in FIG. 21, in the event where a transition occurs to the stoichiometric charge combustion mode from the stratified charge combustion mode during acceleration, with an increase in accelerator pedal travel, the engine operation mode determining means 53 switches the stratified charge combustion mode to the stoichiometric charge combustion mode at a time t11, and then the throttle opening is decreased according to a change in target air-to-fuel ratio afw0 caused due to the combustion mode transition.

Simultaneously, the actual air charging efficiency ce is lowered following the reduction in the amount of intake air but gradually due to a delay in response. The target air-to-fuel ratio determining means 62a changes the target air-to-fuel ratios afw for a transitional operating state correspondingly to the actual air charging efficiency ce. The stratified charge combustion mode lasts until the target air-to-fuel ratios afw is lowered to reach a specified air-to-fuel ratio of, for example, 19. At this time, a correction value thtigwd is determined according to the target air-to-fuel ratio difference dafwbd of a target air-to-fuel ratio afwbd for an ordinary operating state from an eventual target air-to-fuel ratio afw (which is a target air-to-fuel ratio afw0 in an transitional operating state) with reference to the ignition timing correction control map for the stratified charge combustion mode shown in FIG. 14C. A proper ignition timing for an transitional operating state is determined by adding the correction value thtigwd for an ordinary operating state to the basic ignition timing thtigb.

When the target air-to-fuel ratio afw0 lowers below the specified air-to-fuel ratio of 19, while the target air-to-fuel ratio afw0 is changed to the stoichiometric air-to-fuel ratio of 14.7 at one stretch before the actual air charging efficiency ce reaches an ordinary value, temporarily increasing the amount of fuel injection, nevertheless, a correction value thtigwd is determined according to the target air-to-fuel ratio difference dafw0 of a target air-to-fuel ratio afw0 for a transition from the stoichiometric air-to-fuel ratio as an eventual target air-to-fuel ratio afw with reference to the ignition timing correction control map for the stoichiometric charge combustion mode shown in FIG. 14C, by which the ignition timing is retarded from the proper ignition timing at stoichiometric air-to-fuel ratio. This retardation of ignition timing cancels the tendency of output torque to increase due to the temporary increase in the amount of fuel injection, causing the output torque to increase smoothly with an increase in accelerator pedal travel with an effect of preventing an occurrence of torque shock. The retardation of ignition timing is continued until the air charging efficiency reaches a value for an ordinary operating state.

In the control of the amount of intake air and the timing for controlling the amount of fuel injection illustrated by the flow charts in FIGS. 7 and 8, while there are employed both the technique of determining the target indicated mean effective pressure which is used to control the amount of fuel injection on the basis of the virtual air charging efficiency and the technique of performing the first-order advance correction of the target volumetric efficiency which is used to determine a target throttle opening, either one of these techniques may be omitted. While, in the engine control system described above, the intake air flow control means for controlling the amount of intake air according to a target air-to-fuel ratio and a combustion mode determined on the basis of target load employs a throttle valve driven by a motor 27, it may take a form of controlling an intake air flow control valve bypassing a throttle valve mechanically linked to an accelerator pedal. In this case, a throttle opening sensor may be used to detect opening of the throttle valve mechanically linked to the accelerator pedal in place of the means for detecting a value representative of accelerator pedal travel.

The engine control system may be installed to engines other than direct injection-spark ignition type. Such engines include an engine equipped with a fuel injector in an intake port which performs lean-burn while generating a swirl in a zone of lower speeds and lower loads and is controlled by a controller adapted to determine a target load based on which throttle opening and the amount of fuel injection are controlled.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for an engine equipped with a fuel injector for determining a target air-to-fuel ratio based on target loads established according to engine operating conditions and controlling said fuel injector to deliver fuel according to said target air-to-fuel ratio, said engine control system comprising:
    an intake air flow sensor operative to detect actual air charging efficiency;
    an engine speed sensor operative to detect an engine speed of said engine;
    a accelerator sensor operative to detect an accelerator pedal travel; and
    control means for determining a target load based on said engine speed and said accelerator travel, determining a target air-to-fuel ratio based on said actual air charging efficiency and said target load, and determining an amount of fuel injection based on said target air-to-fuel ratio and said actual air charging efficiency.

2. The engine control system as defined in claim 1, wherein said control means controls the engine in a plurality of operation modes which define differently fuel injection timings and are selected according to said target air-to-fuel ratio and determines said fuel injection timing by each said operation mode according to said target load and said engine speed.

3. The engine control system as defined in claim 2, wherein said fuel injector is of a type delivering fuel directly into a combustion chamber of the engine and said control means changes operation of the engine between a stratified charge combustion mode in which said fuel injector deliver fuel in a compression stroke to cause a stratified charge combustion and a homogeneous charge combustion mode in which said fuel injector deliver fuel in an intake stroke to cause a homogeneous charge combustion.

4. The engine control system as defined in claim 1, wherein said control means determines as said target load either one parameter of a virtual air charging efficiency balancing an output torque required for the engine on the assumption that the engine operates with a stoichiometric air-to-fuel ratio and a value corresponding to said virtual charging efficiency and determines said target air-to-fuel ratio based on a ratio of said one parameter to either one parameter of an actual air charging efficiency determined based on said amount of intake air and a value corresponding to said actual air charging efficiency.

5. The engine control system as defined in claim 4, wherein said control means tempers said target air-to-fuel ratio with an improvement ratio of a fuel consumption when said target air-to-fuel ratio is changed toward the lean side from a fuel consumption at a stoichiometric air-to-fuel ratio.

6. The engine control system as defined in claim 1, wherein said control means further determines a target air-to-fuel ratio according to a predetermined relationship between said target load and said engine speed, and determining an eventual target air-to-fuel ratio based on said target air-to-fuel ratio determined based on said amount of intake air and said target load while the engine lasts in a transitional operating state and based on said target air-to-fuel ratio determined according to said predetermined relationship between said target load and said engine speed while the engine lasts in an ordinary operating state.

7. The engine control system as defined in claim 6, wherein said control means corrects an ignition timing according to a difference between said target air-to-fuel ratios for said transitional operating state and said ordinary operating state.

8. The engine control system as defined in claim 1, and further comprising intake air control means for controlling said amount of intake air with which intake air is introduced into an intake line of the engine, wherein said control means determines a control parameter for said intake air control means based on said target load.

9. The engine control system as defined in claim 8, wherein said control means determines as said target load either one parameter of a virtual air charging efficiency balancing an output torque required for the engine on the assumption that the engine operates with a stoichiometric air-to-fuel ratio and a value corresponding to said virtual charging efficiency and determines said target air-to-fuel ratio based on a ratio of said one parameter to either one parameter of an actual air charging efficiency determined based on said amount of intake air and a value corresponding to said actual air charging efficiency.

10. The engine control system as defined in claim 8, wherein said control mean further performs a first-order advance correction of said target load.

11. The engine control system as defined in claim 8, wherein said fuel injector is of a type delivering fuel directly into a combustion chamber of the engine, and said control means changes operation of the engine between a stratified charge combustion mode in which said fuel injector deliver fuel in a compression stroke to cause a stratified charge combustion while an air-to-fuel ratio remains greater than a stoichiometric air-to-fuel ratio and a homogeneous charge combustion mode in which said fuel injector deliver fuel in an intake stroke to cause a homogeneous charge combustion with an air-to-fuel ratio remaining greater than the stoichiometric air-to-fuel ratio, controls an amount of fuel injection so as to change an air-to-fuel ratio greater by a specified value than said stoichiometric air-to-fuel ratio to an air-to-fuel ratio smaller than said stoichiometric air-to-fuel ratio at one stretch during a transition to said stratified charge combustion mode from said homogeneous charge combustion mode, and retarding an ignition timing until an air charging efficiency reaches a value attained in an ordinary operation state from a time at which said air-to-fuel ratio becomes below said stoichiometric air-to-fuel ratio when said transition occurs.

12. The engine control system as defined in claim 11, wherein said control means determines a retardation of said ignition timing according to a difference between target air-to-fuel ratios for a transitional operating state and an ordinary operating state.

* * * * *